United States Patent [19]

Murdoch

[11] Patent Number: 5,258,766
[45] Date of Patent: Nov. 2, 1993

[54] ANTENNA STRUCTURE FOR PROVIDING A UNIFORM FIELD

[75] Inventor: Graham A. M. Murdoch, Perth, Australia

[73] Assignees: Uniscan Ltd., Nedlands; Magellan Technology Pty. Ltd., Myaree, both of Australia

[21] Appl. No.: 806,842

[22] Filed: Dec. 9, 1991

Related U.S. Application Data

[63] Continuation of Ser. No. 499,319, May 31, 1989, abandoned.

[30] Foreign Application Priority Data

Dec. 10, 1987 [AU] Australia .................. PI5855

[51] Int. Cl.$^5$ ............ H01Q 007/000; H01Q 021/000; G08B 013/140
[52] U.S. Cl. .................... 343/742; 343/867; 340/572
[58] Field of Search ............. 340/551, 572; 343/742, 343/867; 324/260; 342/44

[56] References Cited

U.S. PATENT DOCUMENTS

| | | | |
|---|---|---|---|
| 3,500,373 | 3/1970 | Minasy | 340/572 |
| 3,750,167 | 7/1973 | Gehman et al. | 342/44 |
| 3,832,530 | 8/1974 | Reitboeck et al. | 340/572 |
| 3,849,633 | 11/1974 | Reitboeck et al. | 342/44 |
| 3,859,624 | 1/1975 | Kriofsky et al. | 342/44 |
| 3,938,125 | 2/1976 | Benassi | 340/572 |
| 3,990,065 | 11/1976 | Purinton et al. | 340/572 |
| 4,906,973 | 3/1990 | Karbowski et al. | 340/551 |

*Primary Examiner*—Rolf Hille
*Assistant Examiner*—Peter Toby Brown
*Attorney, Agent, or Firm*—Bell, Seltzer, Park & Gibson

[57] ABSTRACT

An apparatus for radiating a magnetic field of substantially uniform magnitude along an axis in a volume of space having width, height and depth directions includes a first coil arranged in the width and height directions and has a first imaginary point as its center. A second coil is arranged in the width and height directions with a second imaginary point at its center and is spaced from the first coil. The first and second coils each have a side and a predetermined configuration and are positioned adjacent each other, in opposite and facing configuration. The first and second coils are spaced by a distance in the range of 2.0 to 0.1 times the length of one of the coil sides. The first and second coils provide in response to a current applied to the coils, a substantially uniform field within the volume of space being located between first and second imaginary points and extending in the depth direction. Also an antenna structure for providing a three dimensional powering field of substantially constant magnitude is disclosed and includes three orthogonal coil pairs.

27 Claims, 21 Drawing Sheets

(EXPLODED VIEW)

(EXPLODED VIEW)

EXCITATION OF X,Y AND Z AXIS WITH SINE AND COSINE EXCITATION

ENVELOPE DETECTOR

STEP INDUCTANCE CHANGE WHEN
CURRENT EQUALS ZERO

STEP CAPACITANCE CHANGE
WHEN VOLTAGE EQUALS ZERO

ANTENNA STRUCTURE FOR PROVIDING A UNIFORM FIELD

This application is a continuation of application Ser. No. 07/499,319, filed May 31, 1989, now abandoned.

FIELD OF INVENTION

The present invention relates to powering and communication apparatus and method(s) for providing and radiating electromagnetic radiation and other data signals. The present invention also relates to receiving and transmitting structures and method(s) for use in communications. The present invention particularly but not exclusively relates to a transponder powering and communication system.

DESCRIPTION OF RELATED PRIOR ART

The Applicants are aware of a number of transponder systems that provide three dimensional (or limited three dimensional) capabilities. These systems utilize a multiplicity of interrogator coils, each coil operating in one of three coordinate axes, to achieve three dimensional operation.

U.S. Pat. No. 3,689,885 and U.S. Pat. No. 3,859,624 disclose systems wherein, along each axis, the same coil is used to power the transponder as well as receive data from the transponder. Isolation of the powering and receiving functions is performed by either only powering one axis at any time and using the other two axes for receiving data or pulsing power transmission along an axis and, during the power transmission "OFF" period, receiving data back on the same axis. During the "OFF" periods an internal oscillator on the transponder generates the transponders clocking and data carrier signal. Should a transponder be orientated along only one axis then the first interrogation scheme as disclosed will not operate fully. No signal from the transponder couples into the other two coil axes and consequently no data is received. However, only if the transponder's transmitting antenna is not coplanar with its power receiving antenna would operation be guaranteed. While non-coplanar transponder coils are feasible the practical realization of them would be relatively expensive. The second interrogation scheme suffers from an inability to precisely control the clocking and carrier frequencies used by the transponder. The frequency of free running or crystal oscillators can vary with time. In addition, crystal oscillators are non-integratable and relatively expensive to implement.

U.S. Pat. No. 3,832,530 discloses a parcel or bag sorting system which utilizes the principle of power absorbtion by the transponder for transmitting data. The interrogator antennas are structured as a cube designed to fit around a conveyor system. All three axes are simultaneously driven from one signal source. Three (3) dimensional operation is achieved by phase shifting the interrogation signal to two (2) of the coil axes. This phase change is made only once during the interrogation time. For an arrangement of coils powering two or three axes driven in phase, there will be a null direction for which the fields cancel.

As disclosed, changing the phase of any single coil shifts the direction of the null. Without accurately defining the null direction before and after shifting, it is possible for a transponder to be poorly coupled into the field during both interrogation cycles and fail to be identified.

U.S. Pat. No. 3,938,125 describes an anti-pilferage system wherein each of the three coordinate axes has a power transmitting antenna and a receiving antenna. The powering signal is sequenced through each axis one at a time. The sequencing is done at a high speed (greater than 1 kilohertz). The transponder is designed to interact with two of the interrogation axes. The presence of a transponder is validated by a signal simultaneously being detected on two of the three axes. The system disclosed is not capable of transmitting data other than a simple presence detection.

The systems disclosed do not generate a uniform field distribution using their interrogation coils.

U.S. Pat. No. 3,859,624 details an elaborate voltage circuitry which is considered inappropriate for a low cost integratable transponder system.

FIGS. 1 and 2 show other prior art coil arrangements.

OBJECTS OF THE PRESENT INVENTION

An object of the present invention is to provide a system which provides a substantially constant (magnitude) power over an irradiated space.

Another object of the present invention is to provide an efficient method and apparatus of powering a unit situated in the powering field irrespective of the orientation of the unit.

Another object of the present invention is to provide method(s) of communication, the signals of which are superimposed on the radiated powering signals.

Another object of the present invention is to provide apparatus which can simultaneously transmit and/or receive power and signals.

Generally, the present invention aims to avoid and/or alleviate shortcomings and disadvantages of the prior art.

DESCRIPTION OF THE INVENTION

The present invention provides an apparatus for radiating a magnetic field in a volume of space having width, height and depth directions, said apparatus comprising:

a first coil arranged in the width and height directions and having a first imaginary point at its center;

a second coil arranged in the width and height directions and having a second imaginary point at its center, the second coil being spaced from said first coil, said first and said second coils each having a side and a predetermined configuration and being positioned adjacent each other in opposite and facing configuration, the first and second coils being spaced by a distance in the range of 2.0 to 0.1 times the length of one of the coil sides, wherein:

said first and said second coils are adapted to provide, in response to a current applied to the coils, said magnetic field with said volume, the volume being located between said first imaginary point and said second imaginary point.

The present invention also provides an apparatus for radiating a magnetic field of substantially uniform magnitude along an axis in a volume of space having width, height and depth directions, said apparatus comprising:

a first coil arranged in the width and height directions and having a first imaginary point at its center, a second coil arranged in the width and height directions, having a second imaginary point at its center, the second coil being spaced from said first coil, said first and said second coils each having a side and a predetermined configuration and being positioned adjacent each other, in opposite and facing configuration, the first and second coils being spaced by a distance in the range of 2.0 to 0.1 times the length of one of the coil sides, wherein:

said first and said second coils are adapted to provide in response to a current applied to the coils, said substantially uniform field within said space, said space being located between said first imaginary point and said second imaginary point and extending in the depth direction.

The first and second coil spacing may lie preferably within the range 1.2 to 0.5 times the length of one of the coil sides. Most preferably, the spacing is substantially 0.8 times the length of one of the coil sides.

Reference herein to rectangular coils equally applies and incorporates square, elliptical, triangular, circular and polygonal coils.

In the case of polygonal, circular and elliptical coils, the length of one of the coil sides refers to a length substantially equal to twice the radial length or the diameter.

Further description of the present invention herein will be made with regard to a substantially square coil configuration as an example only of the present invention.

The present invention further provides the apparatus described hereinbefore, wherein at the surface of an imaginary tube surrounding the constant field, the tube surface being spaced radially at an average distance of substantially 0.25 times the length of one of the coil sides from the axis of the constant field, a measurable magnetic field strength relative to the constant field axis is substantially 20% greater at a point proximate the first or the second coil, the measurable strength decreasing toward a minimum strength point on the tube surface located substantially midway between the two coils, the measurable strength of the minimum point being substantially 10% less relative to the constant field axis.

The present invention also provides an electromagnetic field radiator structure comprising:

two coils spaced, in opposing fashion along substantially parallel planes, by a distance substantially in the range 1.2 to 0.5 times the length of a side of one of the coils, the coils, when influenced by electric current, providing a region of substantially constant magnitude electromagnetic field strength, lying substantially perpendicular to the coil planes and intersecting the planes.

The present invention also provides an antenna structure comprising:

an even numbered plurality of coils, one half of which are arranged to form a first plane, the other half of which are arranged in a second opposingly facing and spaced plane, first plane coils being positioned in mutual and opposite registration to second plane coils, opposing coils being spaced from each other at a distance in the range 1.2 to 0.5 times the length of a side of one of the opposing coils, wherein upon inducing a current into the plurality of coils, a substantially constant magnitude field is provided in a third plane, said third plane passing between the first and the second planes in a direction perpendicular to the planes and passing through a center point of each coil.

The present invention also provides an antenna structure for providing a powering field of substantially constant magnitude extending in X, Y and Z directions, the antenna comprising:

a first coil having first and second opposingly positioned windings, the first coil being arranged to provide, in response to a first current, a first field extending in a first plane in the X direction, a second coil having third and fourth opposingly positioned windings, the second coil being arranged to provide, in response to a second current, a second field extending in a second plane in the Y direction, a third coil having fifth and sixth opposingly positioned windings, the third coil being arranged to provide, in response to a third current, a third field extending in a third plane in the Z direction, the first, second and third fields being of substantially equal magnitude, each field being of substantially constant magnitude interposed with their respective windings, thereby providing in the X, Y and Z directions a three dimensional (3 D) substantially constant magnitude field.

The present invention in one form also provides the antenna as described hereinbefore, wherein each winding comprises loops, each loop being substantially square or circular in configuration, having sides or diameter of a length d, when viewed from a point perpendicular to the respective plane, and, wherein each opposing winding is spaced from each other a distance in the range 1.2 d to 0.5 d.

The present invention in another form also provides the antenna as described hereinbefore, further wherein each winding comprises loops, each loop being substantially rectangular or elliptical in configuration, having a side or minor diameter of a length d, when viewed from a point perpendicular to the respective plane, each loop having a substantially C-shaped cross section when viewed from a point in the respective plane, the C shape being substantially d in height and having upper and lower extensions inwardly perpendicular to the respective plane, the extensions being in the range 0 d to 0.5 d and preferably substantially 0.3 d in length, and wherein each opposing winding is spaced from each other a distance in the range 0 d to 1.0 d and preferably substantially 0.1 d. The C shape loop for the elliptical configuration is inwardly curved to a radius preferably 0.5 d with an arc height substantially 0.3 d and each opposing winding is spaced substantially d apart at the center.

The present invention provides in another form described above having C-shaped cross section loops, a magnetic field being cubic-like or spherical-like in configuration, and being the space formed by the intersection of 3 tubes respectively orientated in X, Y and Z directions about each magnetic field axis, the space being centered around the 3 D substantially constant field, and wherein, within the space sphere, the field strength varies in intensity from about 20% to 10% greater in regions proximate the coils to about 10% less in regions proximate the center of the sides of the 3 D antenna structure, relative to the 3 D constant field.

The present invention also provides the antenna as described hereinbefore, further wherein at least one coil comprises opposed windings, each winding having C-shaped loops.

The present invention also provides the antenna as described hereinbefore, further wherein in a sequential and cyclic manner two coils are energized to irradiate power at the same time and the other coil is left idle, the energized coils being selected such that over a period of time, substantially equal amounts of energy radiate in the X, Y and Z directions.

The present invention also provides the apparatus, radiator or antenna hereinbefore described, further wherein information signals are incorporated with the respective coil currents so that coding of the modulation of the inductive powering field radiated from the respective coil allows for appropriate decoding of the information signals by an external power receiving unit.

The present invention also provides the antenna as described hereinafter wherein signals radiated by a transponder in the powering field can be received for decoding by the interrogator in the presence of interference.

Preferred embodiments or arrangements of the present invention will now be described with reference to the accompanying drawings, wherein.

Figure 7B:
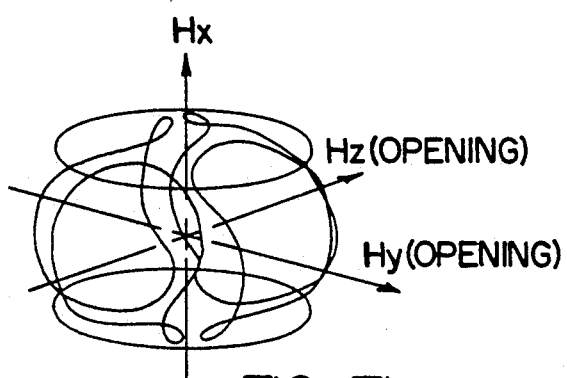
Figure 7C:
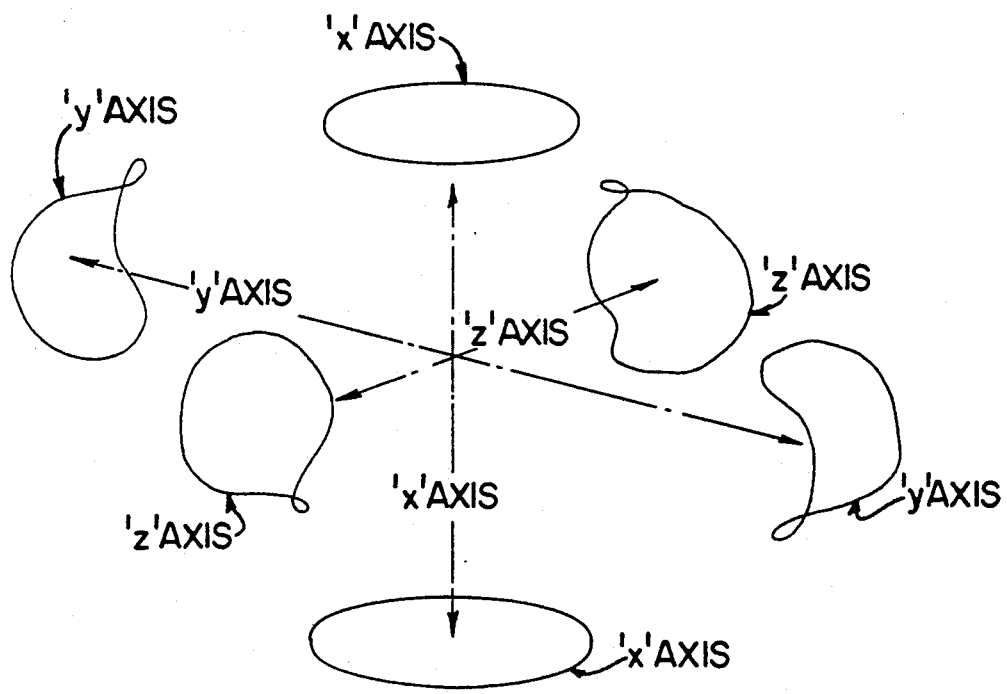

FIGS. 6a, 6b, 7a, 7b and 7c show further field radiator arrangements. Note FIG. 7b and 7c shows both exploded and 3 D formed views.

Figure 8:
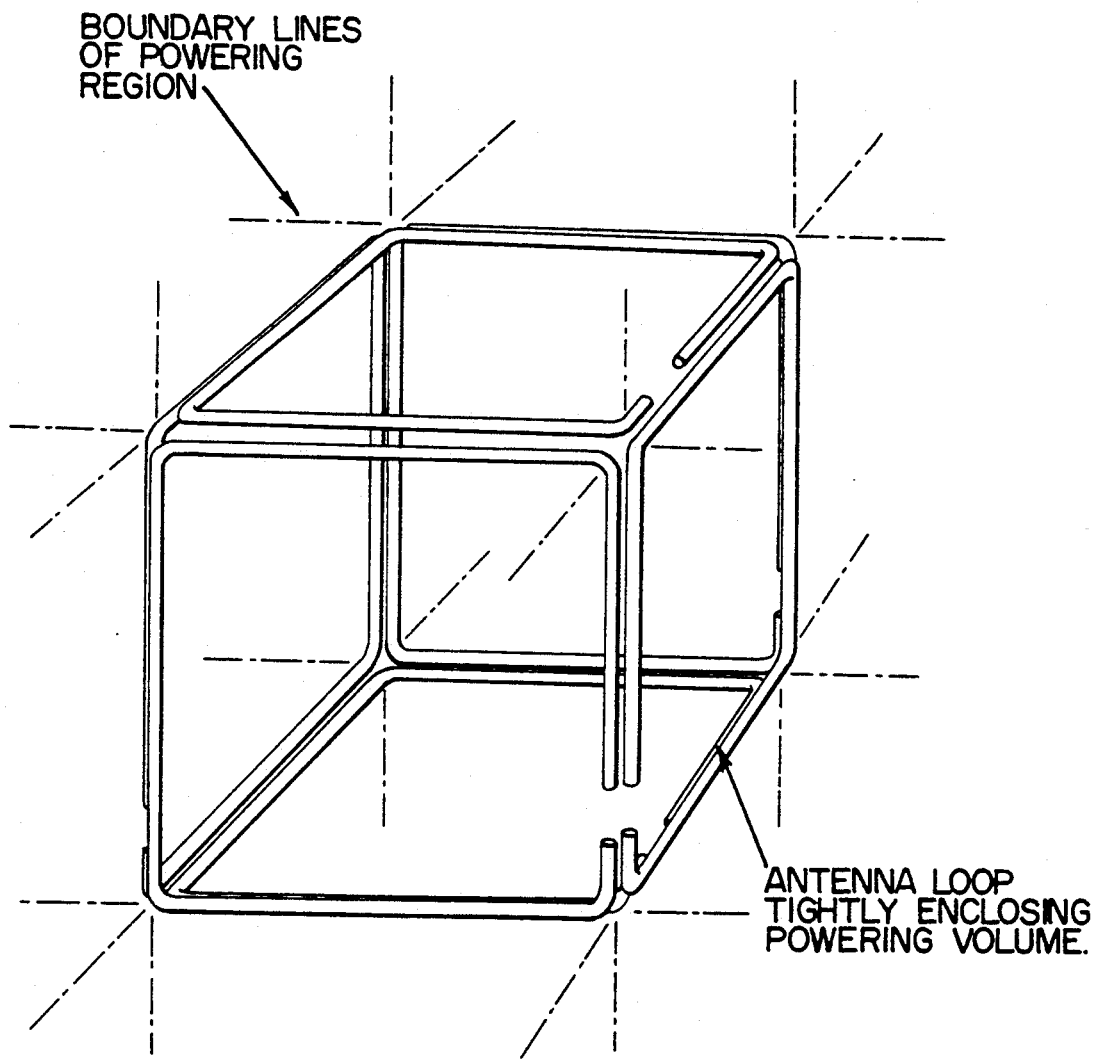

FIG. 8 shows an antenna loop.

Figure 9:
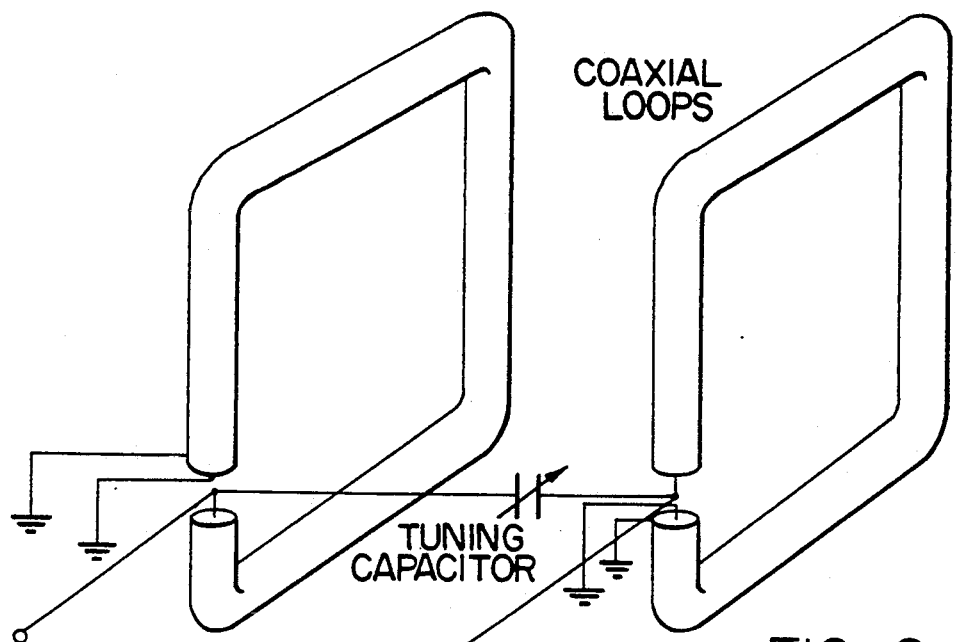

FIG. 9 shows a parallel connected antenna loop.

Figure 10:
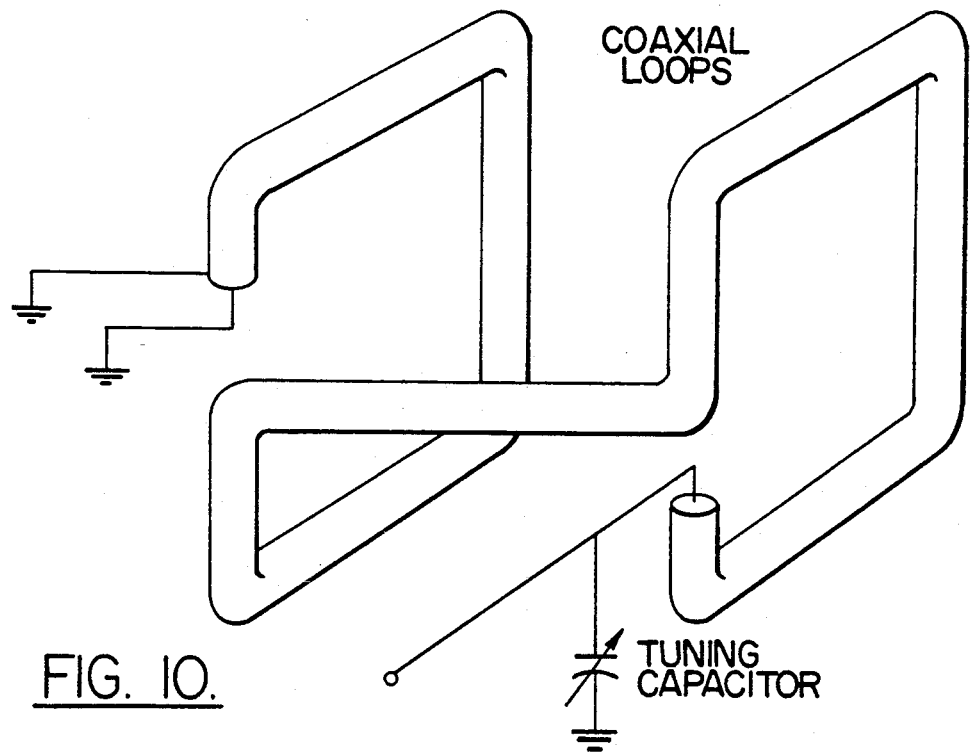

FIG. 10 shows a series connected antenna loop.

Figure 11:
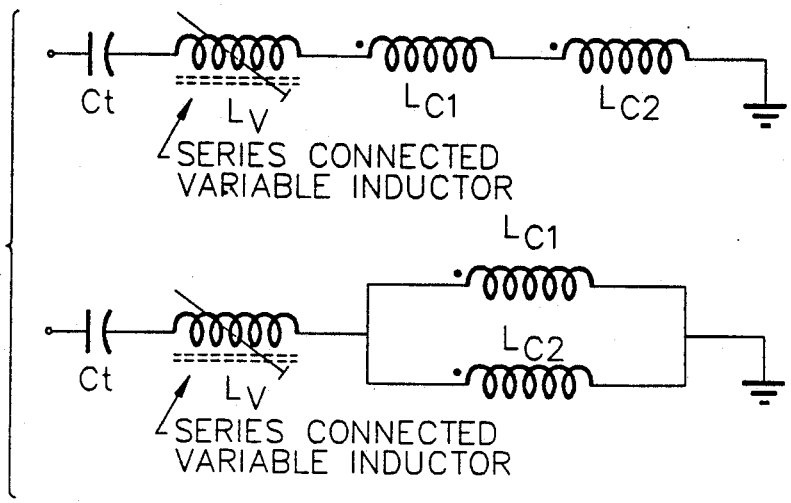
Figure 12:
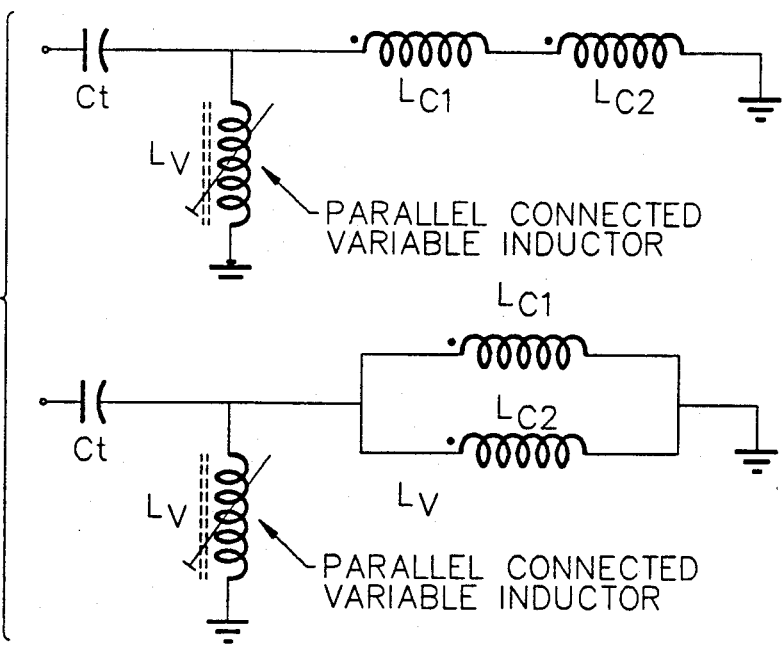

FIGS. 11 and 12 show two series and two parallel, respectively, coil configurations incorporating a variable inductance.

Figure 13:
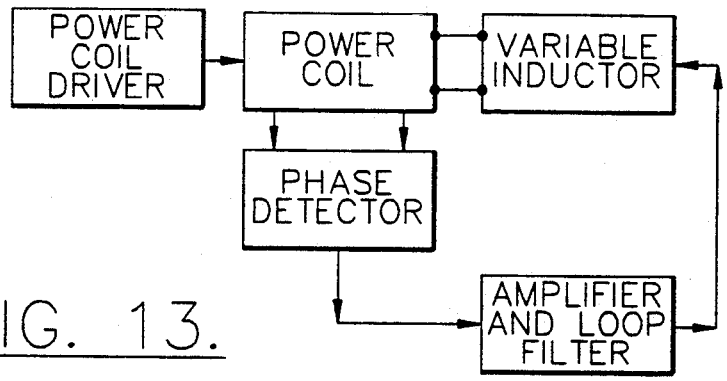
Figure 14:
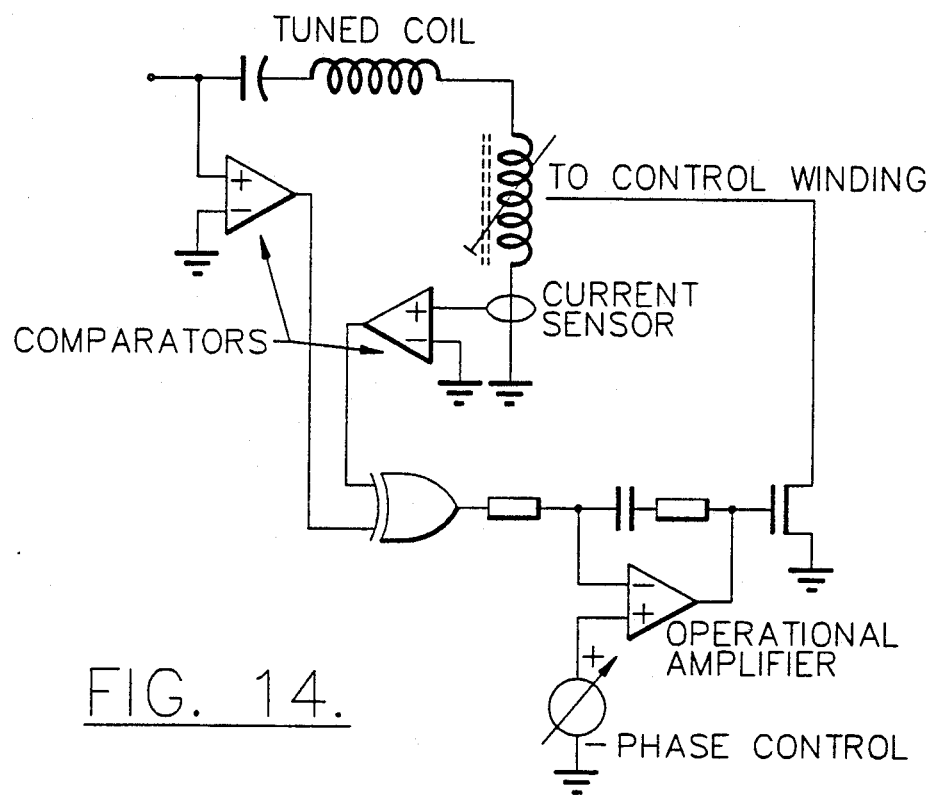

FIGS. 13 and 14 show a phase feedback loop.

Figure 15:
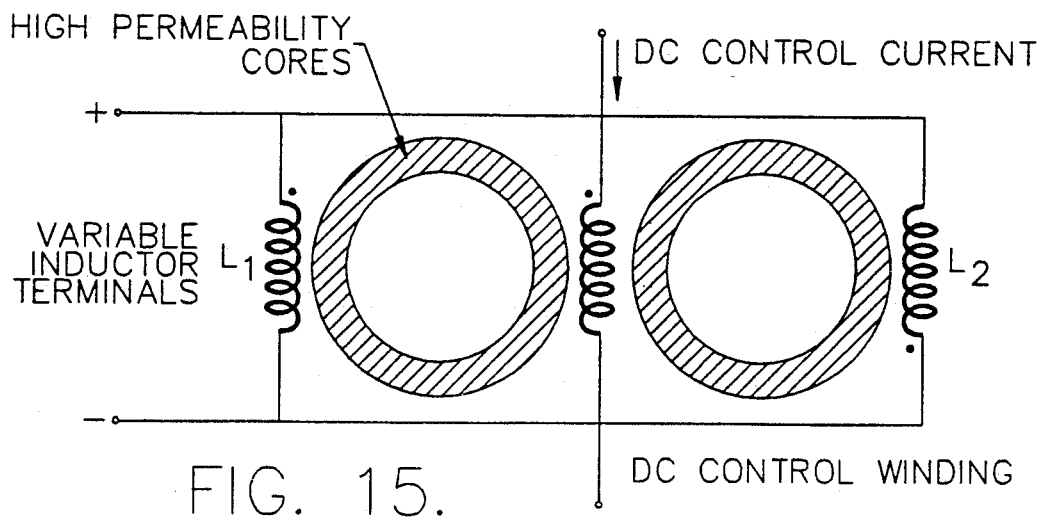

FIG. 15 shows a preferred embodiment of the variable inductance.

Figure 16:
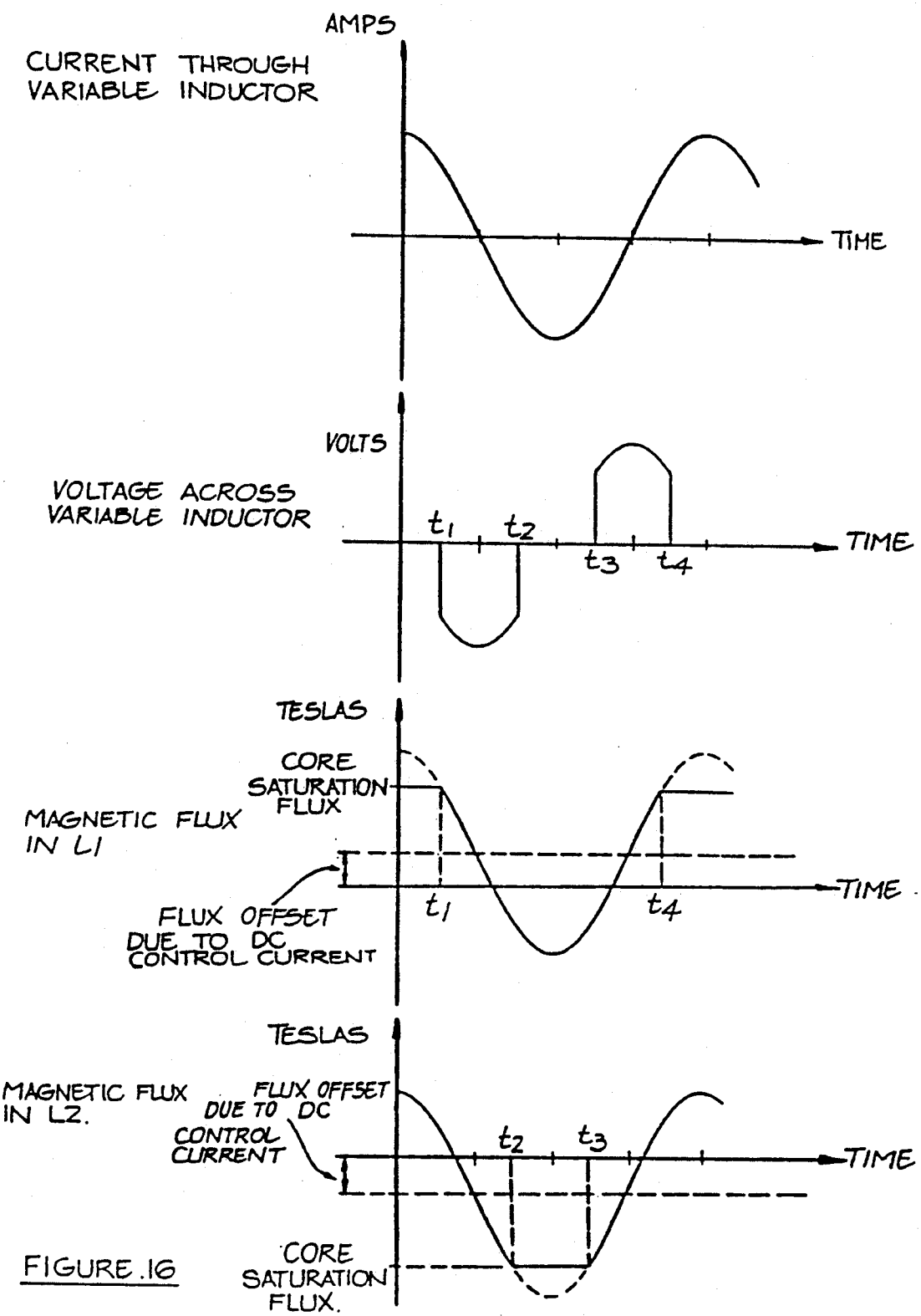

FIG. 16 shows wave forms associated with a variable inductance.

Figure 17:
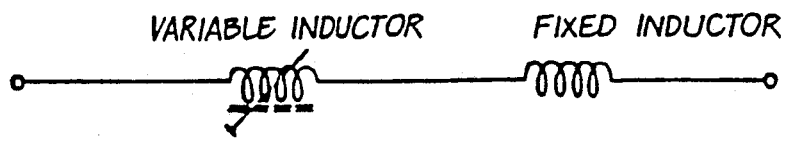

FIG. 17 shows one embodiment of a resonant frequency control circuit.

Figure 18:
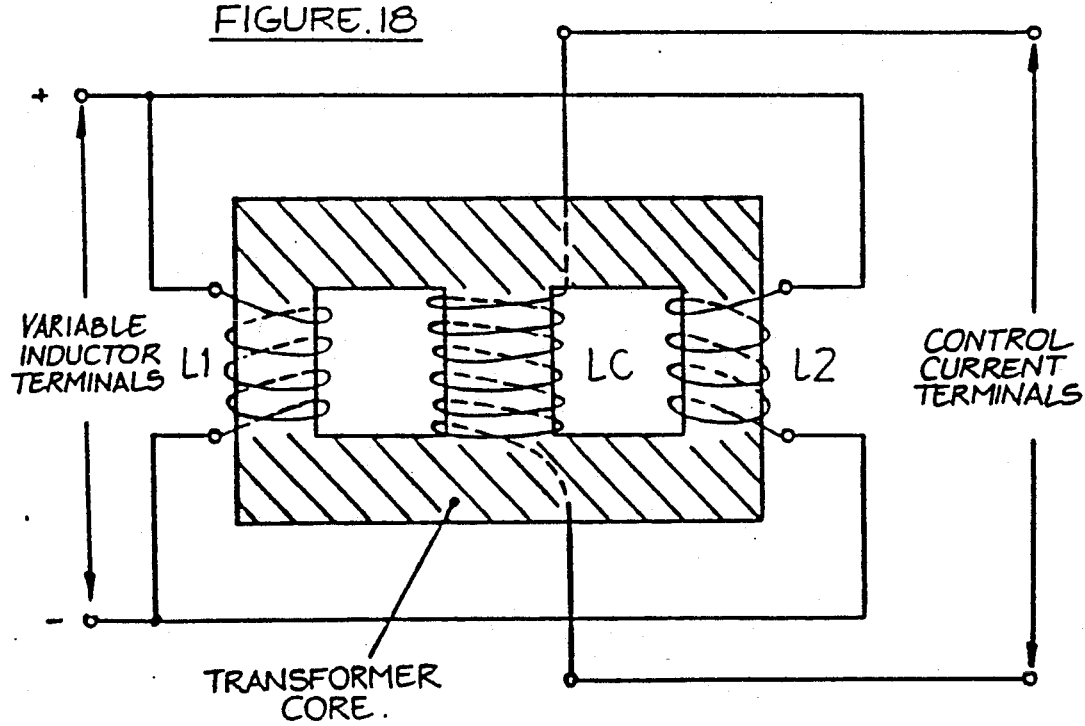

FIG. 18 shows another embodiment of a variable inductance.

FIGS. 19, 20, 21A and 21B show alternative variable capacitors and their respective waveforms.

Figure 22:
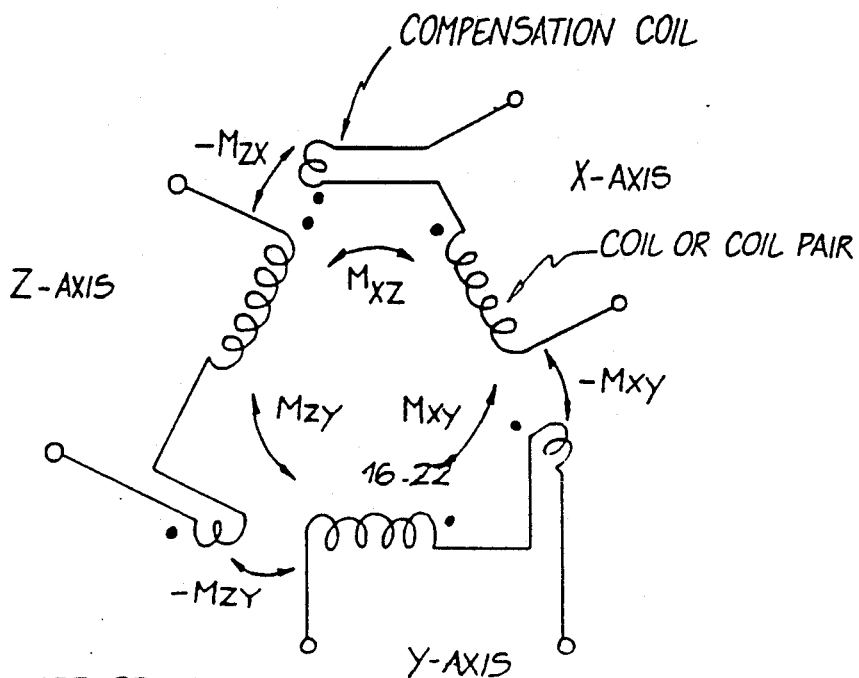

FIG. 22 shows a system for cancelling mutual coupling between powering coil axes.

Figure 23:
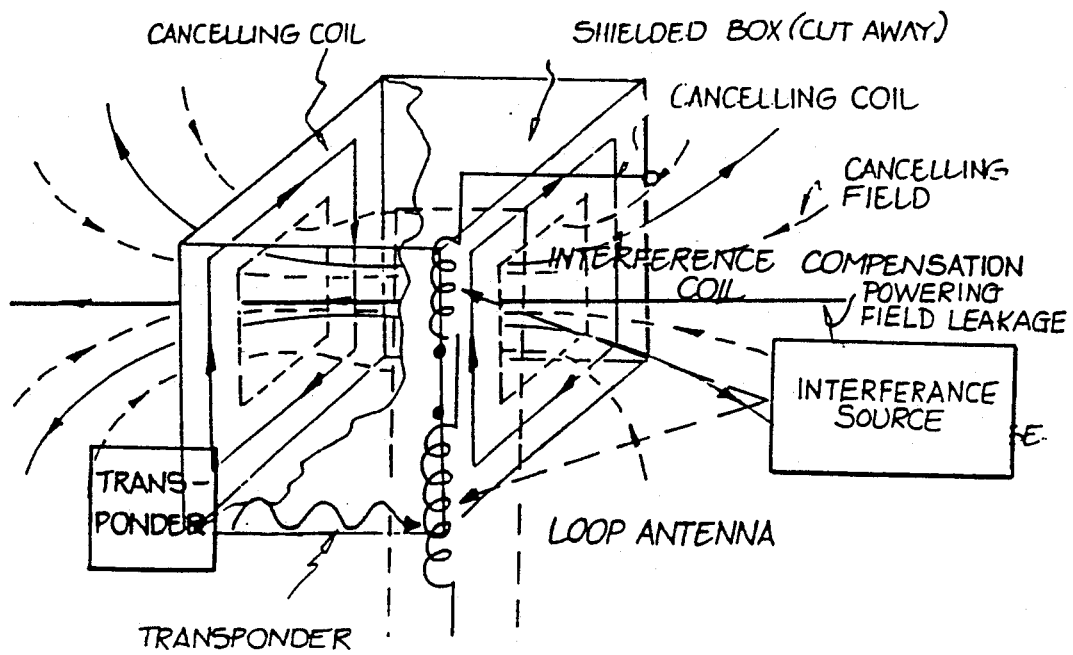

FIG. 23 shows a leakage field reduction scheme.

Figure 24:
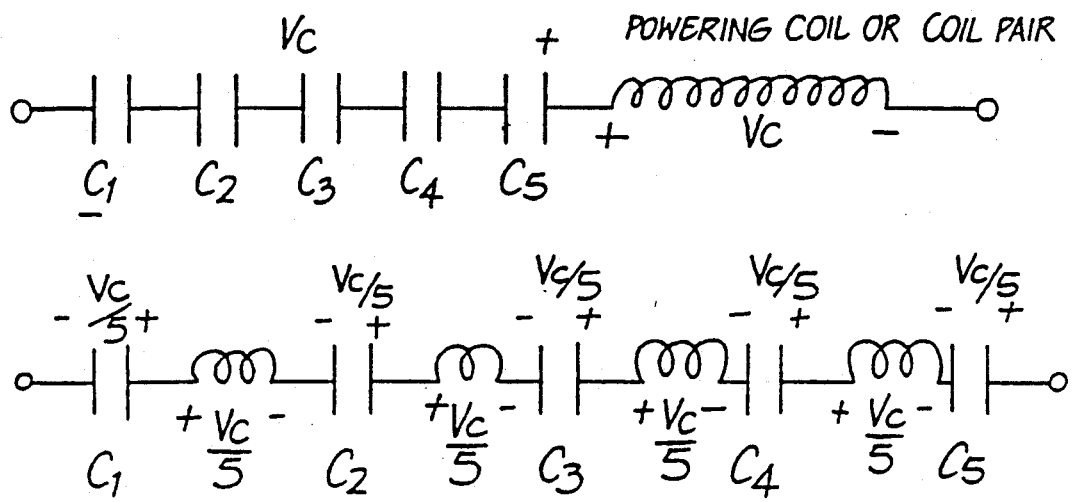

FIG. 24 shows a method of reducing the series voltage across the powering coils or coil pairs.

Figure 25:
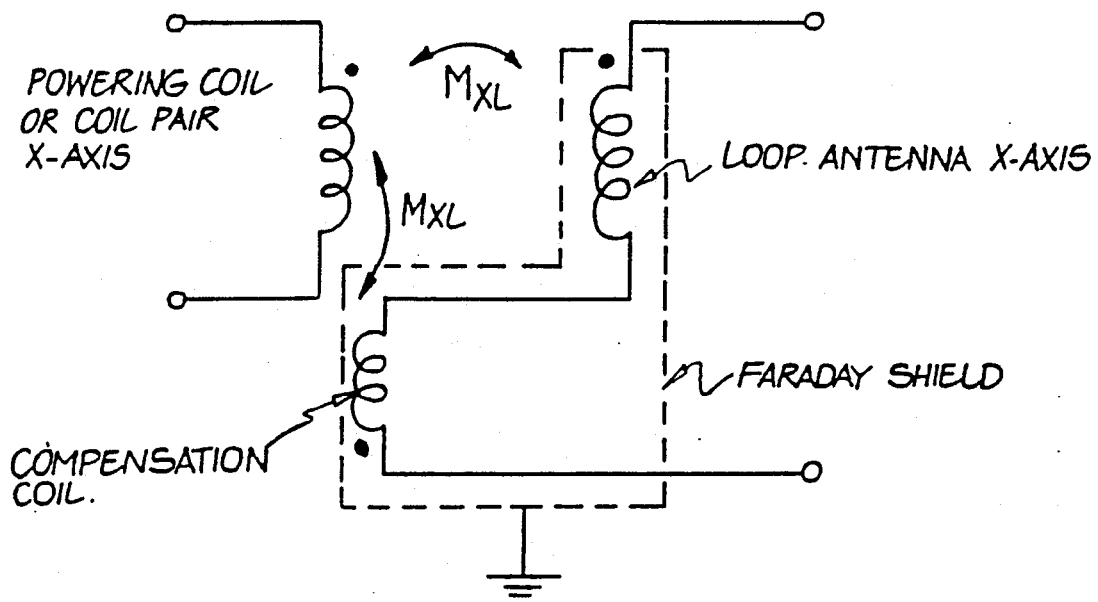
Figure 26A:
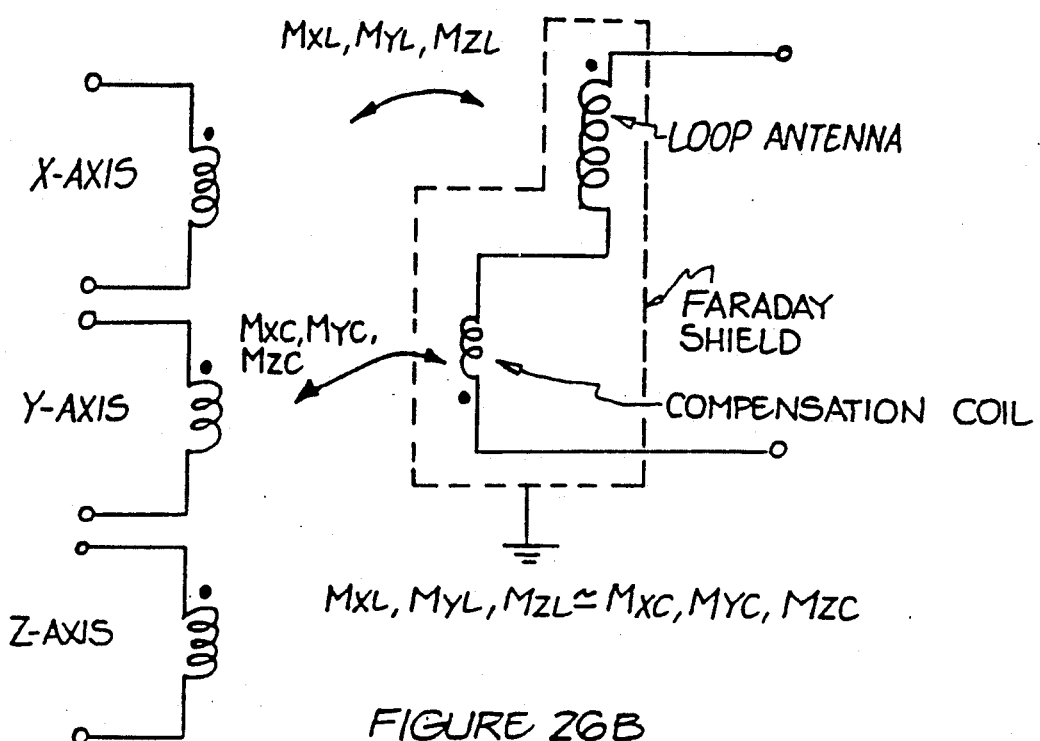
Figure 26B:
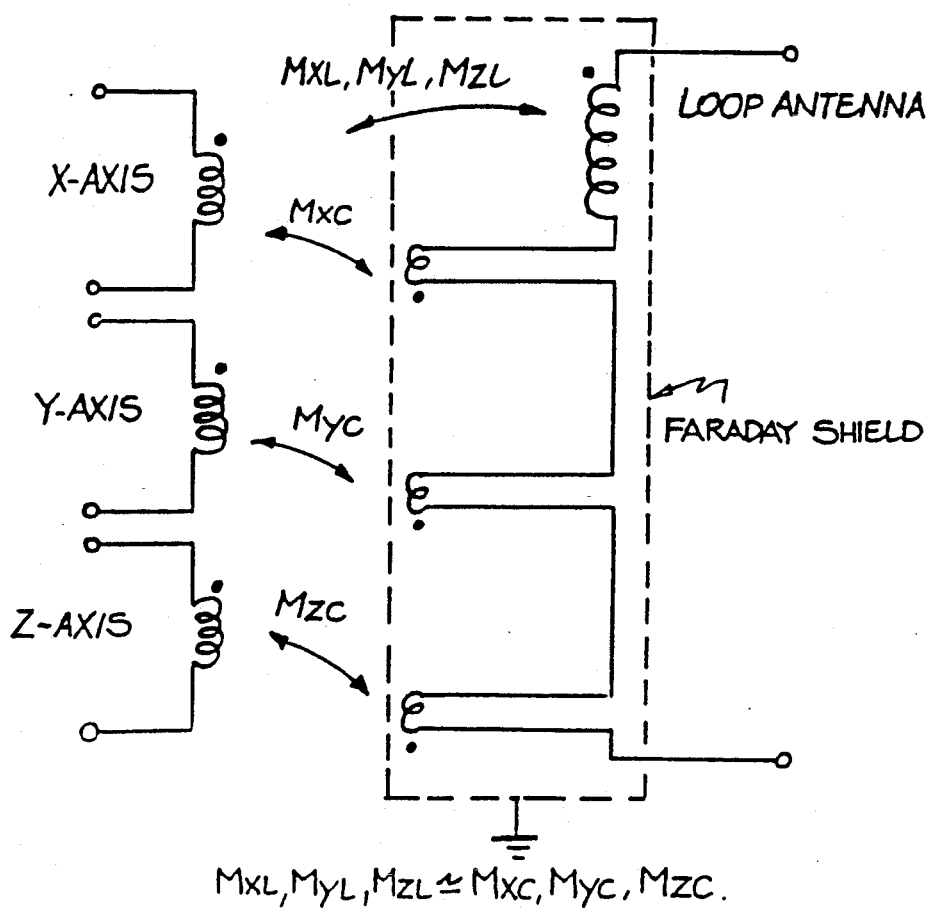

FIG. 25, 26A and 26B show a method of reducing the coupling to an antenna.

Figure 27:
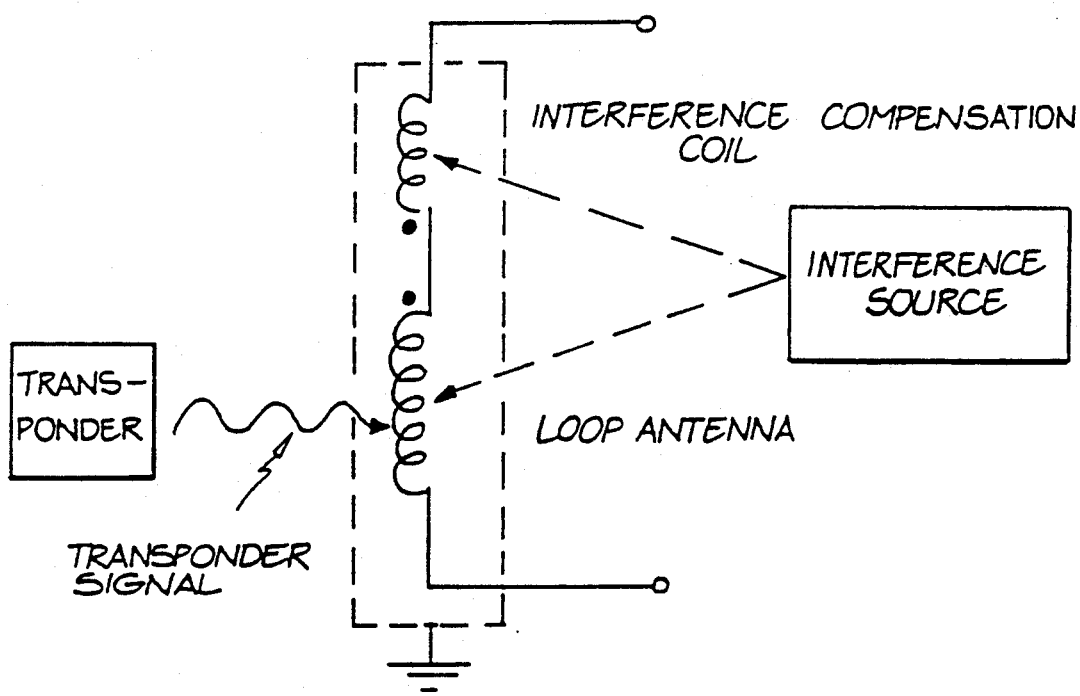

FIG. 27 shows a method of reducing interference to an antenna.

Figure 28:
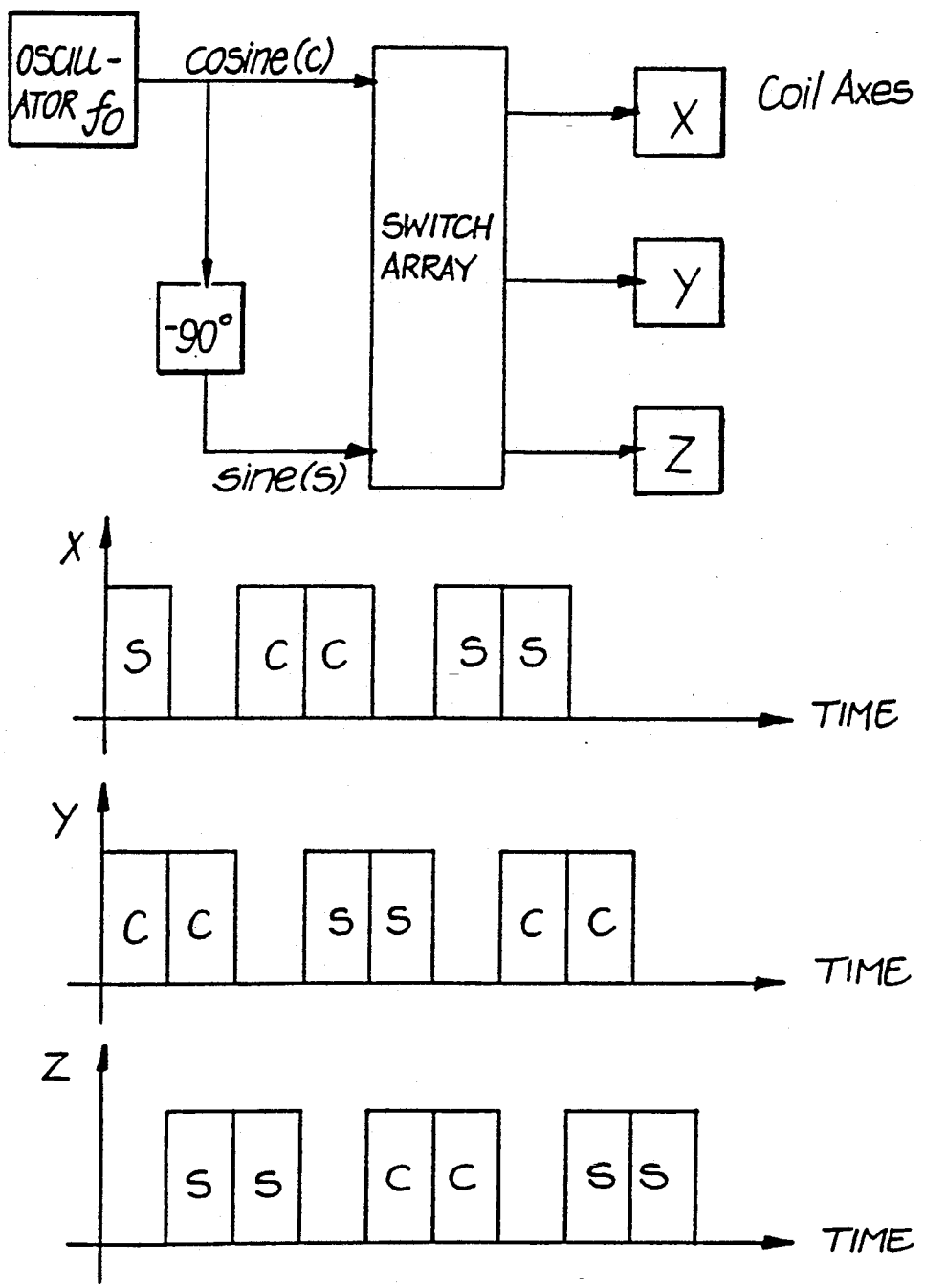

FIG. 28 shows the preferred coil axis excitation scheme.

Figure 29:
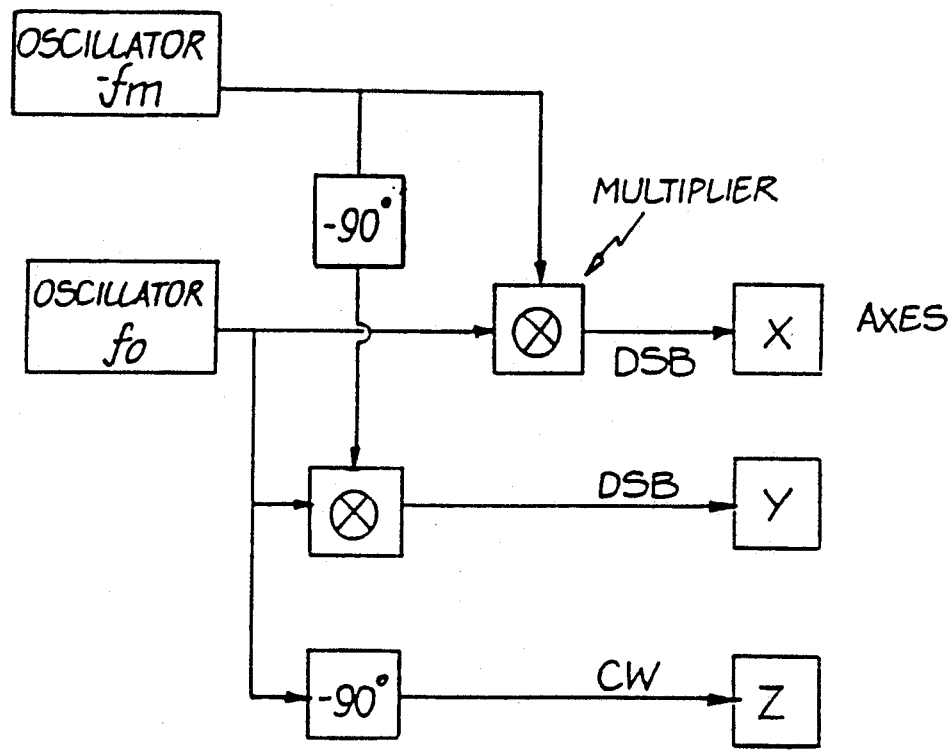

FIG. 29 shows one method of generating a constant magnitude powering field, wherein double side band modulation is on two axes, continuous wave on the third axis.

Figure 30:
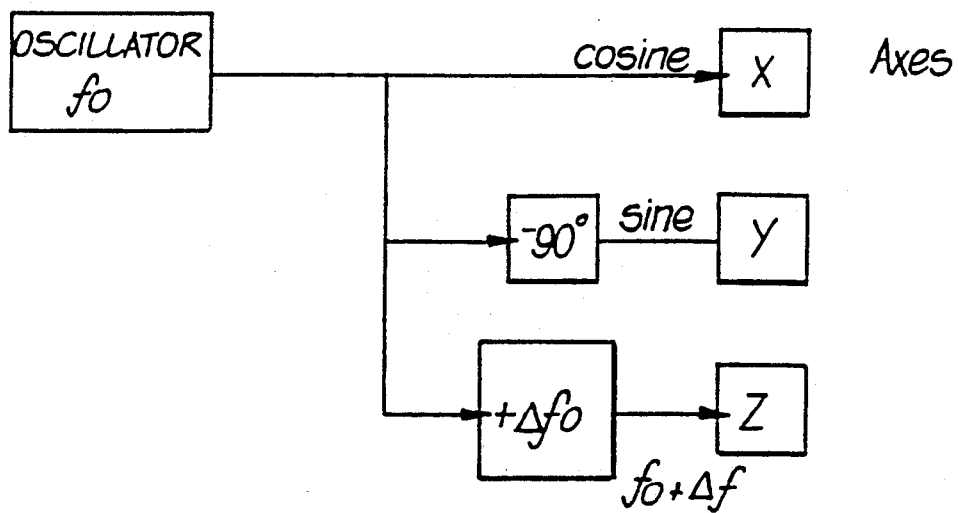

FIG. 30 shows another method of generating a constant magnitude powering field, wherein sine and cosine is on two axes, offset frequency continuous wave on third axis.

Figure 31:
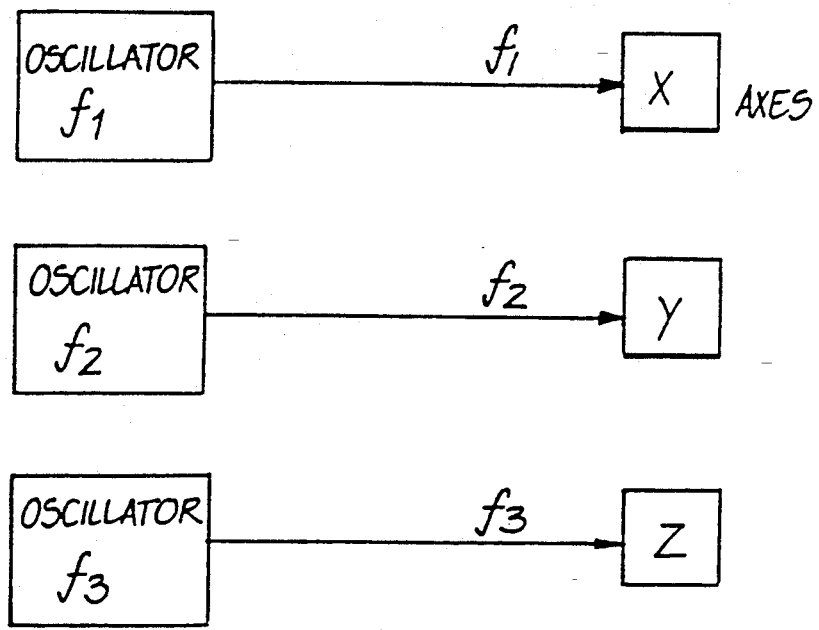

FIG. 31 shows yet another method of generating a constant magnitude powering field, wherein a marginally different frequency is on each of three axes.

Figure 32A:
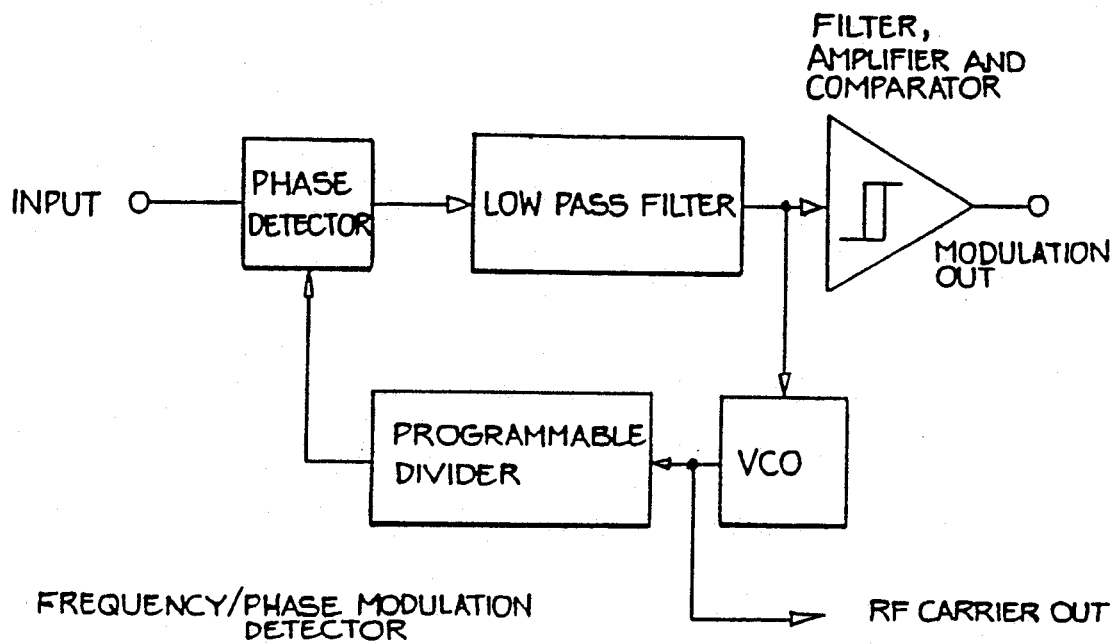
Figure 32B:
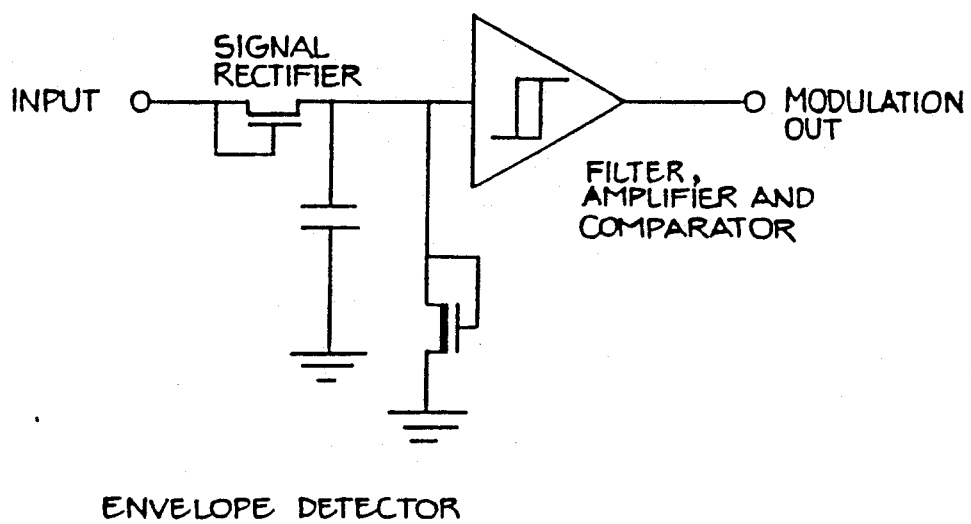

FIGS. 32A and 32B show two preferred transponder circuits for detecting modulation of the powering field.

Figure 33A:
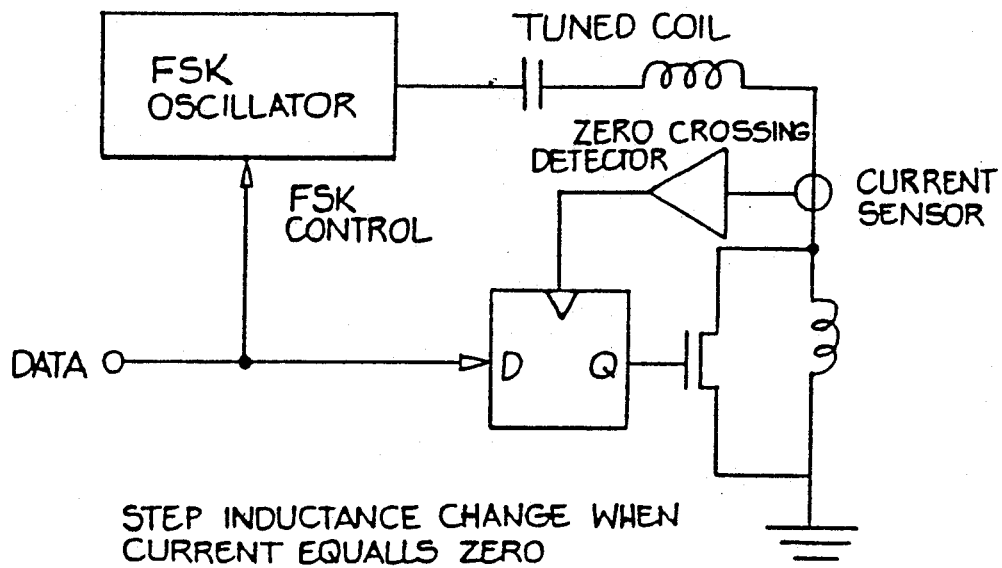
Figure 33B:
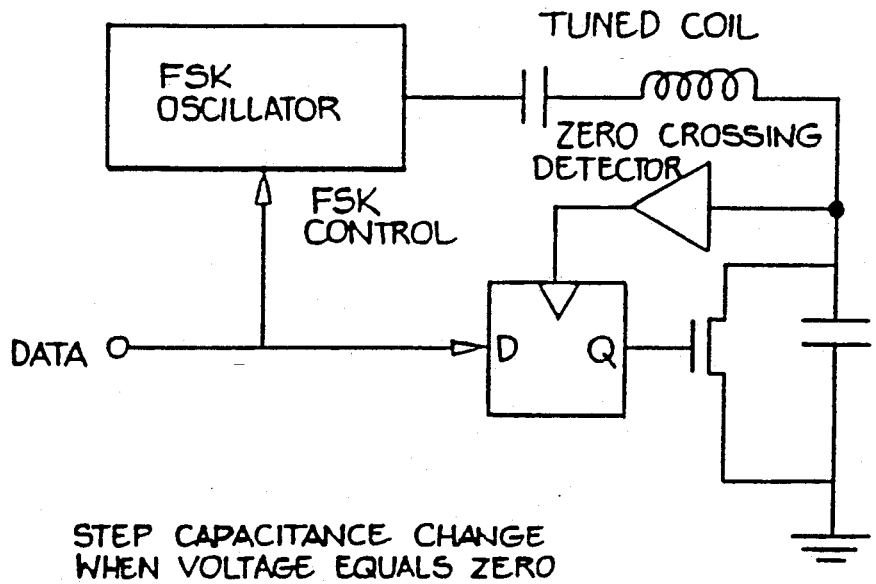

FIGS. 33A and 33B show two preferred circuits for generating FSK or PSK modulation of the powering field.

Figure 34A:
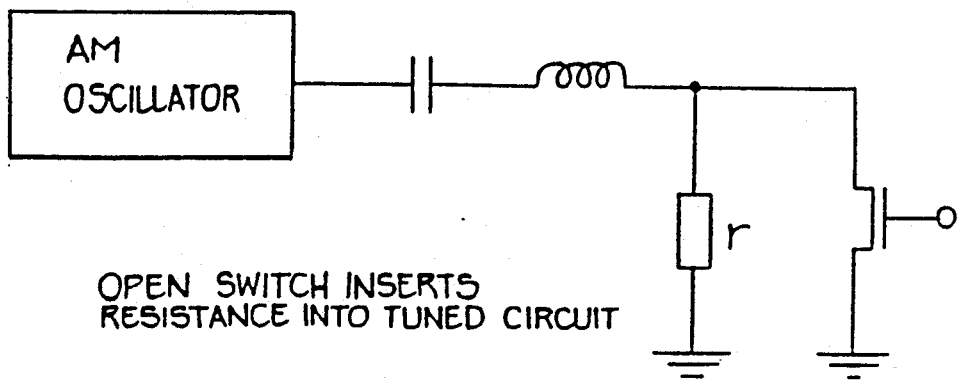
Figure 34B:
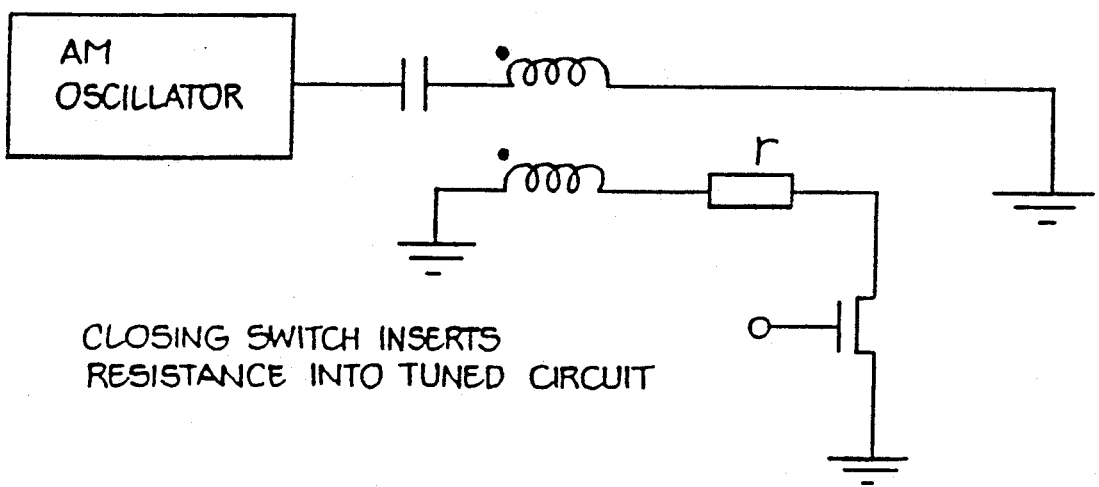
Figure 34C:
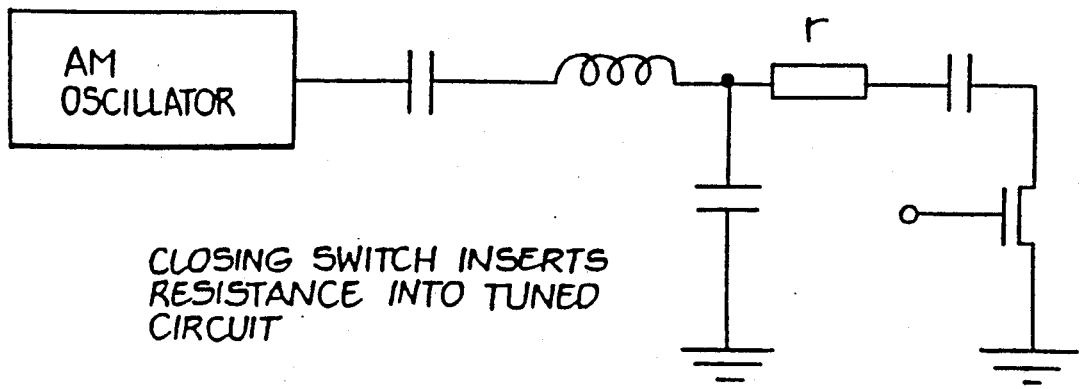

FIGS. 34A, 34B, and 34C show three preferred circuits for modulating the amplitude of the powering field for AM, PM or any other amplitude modulation scheme.

The present invention is advantageously adapted for passive transponder powering and communication systems and methods, but the disclosure herein should not be construed as limited to such a transponder system application. The application of the present invention, however, provides an explanatory example. Accordingly, further description of the invention will be made in a non-limiting way with reference to such an application. The present invention allows for powering and/or communication within a space irradiated by a substantially constant magnitude electromagnetic field.

The simultaneous action of power transfer and data or command transmission by the same magnetic field may allow the remote control of circuits and the remote programming of EEPROM or conventional CMOS memory with battery backup in a known manner.

The transponder utilizes a coil to simultaneously pickup the powering magnetic field and transmit the transponders identifying signal.

The voltage picked up by the transponder coil is dependent upon the cosine of the angle between the transponder coil axis and the direction of the magnetic field.

For those applications where the orientation of the transponder will be random such as baggage and livestock identification, special driver coils and coil drivers are necessary.

Ideally the power transferred to the transponder coil should be independent of transponder orientation and constant over a volume of space so that rapidly moving transponders can be satisfactorily identified.

Three dimensional powering and communication structures should be used where transponder orientation may be random.

For situations where the transponder coil axis is always in the same plane, only a structure having at least one coil may be necessary.

A method and apparatus for transmitting data and/or power using an inductive powering field may be as follows:

Generally, data or command instructions can be transmitted by modulating an oscillating magnetic field. The oscillating field may be also used to transmit power to an inductively coupled tuned distant unit. The distant unit might be a transponder, actuator or any other unit. A modulation detector on or in the transponder may detect the modulation and so present it to appropriate decoding circuitry (FIGS. 32A and 32B).

The transponder may utilize the frequency of the powering field as a frequency reference for the generation of its internal clocking signals and data carrier signal(s). Utilizing the powering field as a frequency reference at all times allows the interrogator to use coherent detection of the transponder data signal. The interrogator's coherent detection circuitry being similarly locked to the powering field frequency reference.

For an arbitrarily modulated oscillating magnetic field, the signalling rate may be limited by the bandwidth of the transponder circuit. This bandwidth should be sufficiently large to allow a data rate of required number of bits per second.

Preferably, the magnetic field may be phase or frequency modulated because these do not appreciably affect the magnitude or intensity of the power transmitted from the transmitter to the receiving unit.

Frequency, phase, amplitude or pulse width or position modulation or any combination of these can be used to modulate the magnetic powering field (FIGS. 33A, 33B, 34A, 34B and 34C).

Figure 1:
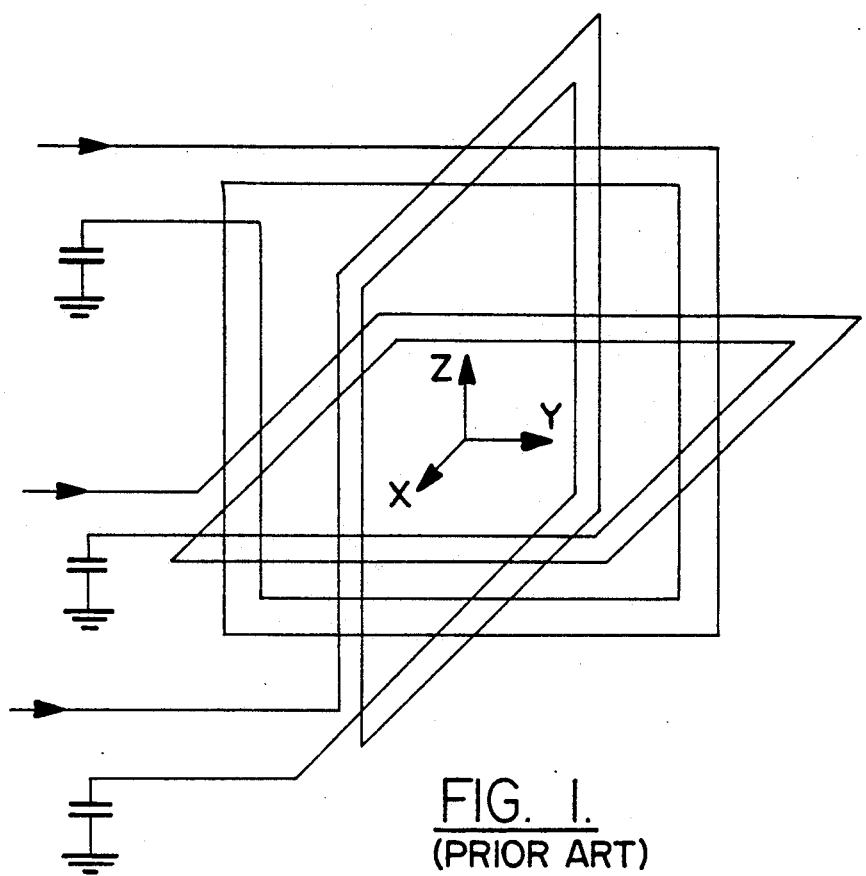
FIGS. 1 and 2 show a prior art arrangement, as hereinbefore described.
Figure 2:
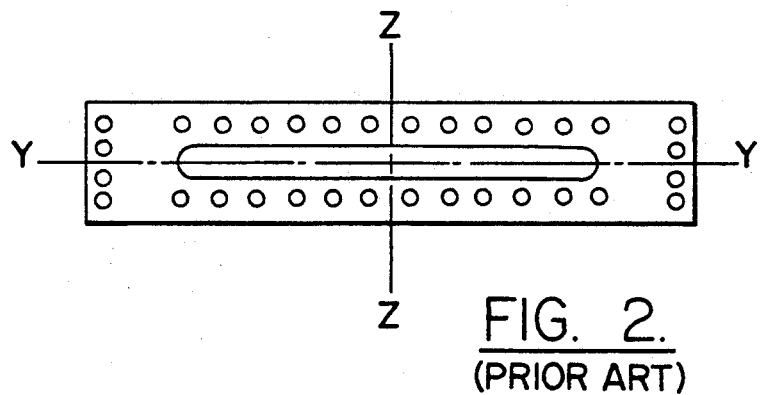
Figure 3:
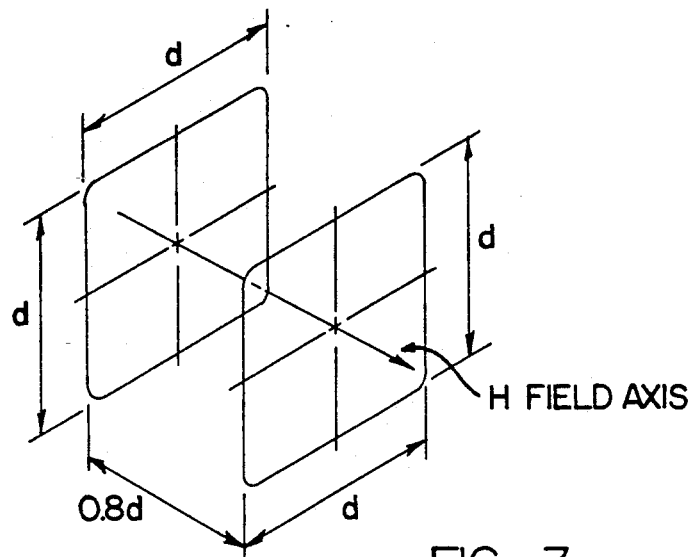
FIGS. 3 and 4 show a coil spacing to generate a substantially constant power field in one axis.
Figure 4:
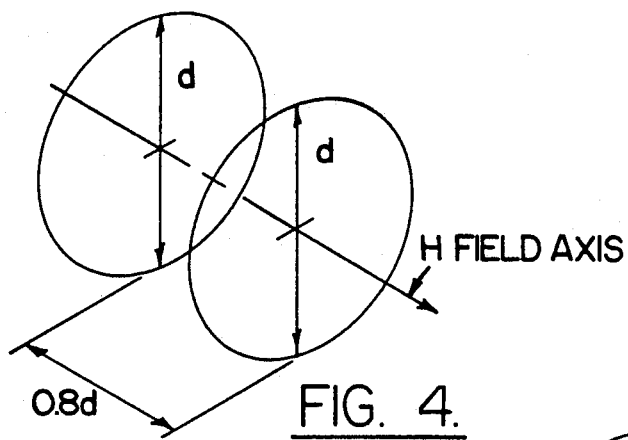

To provide a substantially uniform powering field three sets of coils may be orientated along the X, Y and Z axes, respectively. The phase and frequency used to drive these coils can be carefully controlled to generate a substantially constant magnitude powering field. Also, to provide a uniform field over a volume of space, the magnetic field along each axis is generated by one, two or more coils as are necessary. Preferably, bent coil pairs are used. The coil size, bent C shape and spacing ratios represent a departure from the standard helmholtz coil arrangement. The two coils are facing each other but for coils that are substantially square in shape, they are spaced at a distance in the range 1.2 to 0.5 and preferably substantially 0.8 times the length of an adjacent edge of one of the coils. This new spacing provides an adequate field along the coil axis and a substantially constant field over a large fraction of the volume enclosed by the coils. FIGS. 3 and 4 show such an arrangement.

A uniformly distributed field over the largest possible interrogation volume increases identification reliability by providing constant coupling efficiency over that volume. Constant coupling ensures both uniform data transmission from and powering to of the transponder with commensurate reductions in voltage control circuitry on the transponder.

Figure 7A:
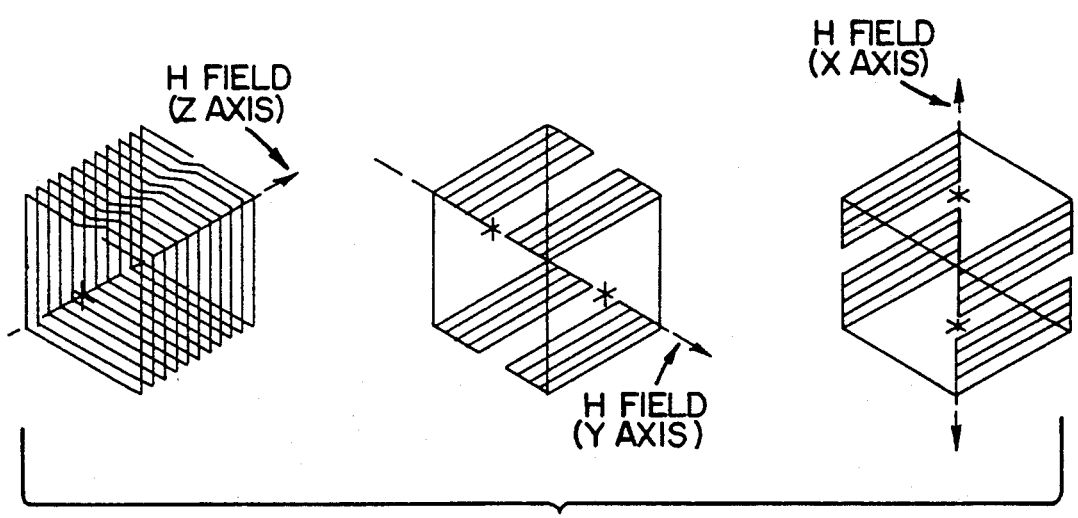

FIGS. 7a, 7b and 7c show three sets of coils (in X, Y and Z axis) arranged to form a box or ball like structure, through the center of which a transponder may pass. Inside the structure of the present invention, the power transferred to the transponder is substantially constant in magnitude over a well defined volume within the enclosed space.

It should be noted that for those applications where the orientation of the tag is fixed or known, elaborate powering schemes may not be necessary. Only one coil or coil pair may be required to provide a powering field operatively corresponding in orientation to the fixed or known orientation.

It can be shown that for single frequency sinusoidal magnetic excitation of the three coordinate axes, there will always be a null direction i.e. a direction in which the field will be zero.

There are several methods by which the constant magnitude powering field may be generated; only some of which are detailed below as preferred methods (a) to (d):

(a) Two of the coils or coil pairs can be driven at a frequency with a phase angle of substantially 0°. The third coil or coil pair can be driven at the same frequency but at a phase angle of substantially 90°. The amplitude of the first two coils is then double side band (DSB) modulated at a low frequency with a phase angle of substantially 90° between the two amplitudes used to modulate the coils. This combination of signals produces a circularly polarized magnetic field which rotates about the axis of the third coil. By adjusting the relative magnitudes of the signals along each axis to compensate for the frequency characteristics of the transponder pickup coil, constant power independent of orientation will be absorbed by the transponder (FIG. 29).

(b) Two of the coils or coil pairs can be run at the same frequency phased substantially 90° apart. This provides a circularly polarized field in the axis plane of the two coils. The third coil or coil pair can be run at a slightly different frequency. The circularly polarized field can be tipped on its side and proceed to precess about the third coil at the difference frequency between the two driving frequencies. The power picked up by a transponder is substantially uniform without regard to orientation (FIG. 30).

(c) The three coils or coil pairs can be run at three slightly different frequencies. Provided that the magnitude of each axis field is adjusted to compensate for the frequency characteristics of the transponder, then the power picked up by the transponder will be substantially independent of orientation (FIG. 31).

(d) The coils or coil pairs can be sequentially or cyclically activated such that at least one coil or coil pair is active at any point in time. The cycle time must be short enough to ensure that a transponder could not pass through the driving coils without being activated. Rapid cycling of coil activation should enable the power picked up by a through passing transponder to be independent of its orientation.

Options (a) to (d) represent only some preferred choices for substantially uniform magnitude powering field.

Another method and apparatus for generating a uniform magnetic field over a well defined volume suitable for two or three dimensional inductive powering of a randomly orientated transponder is also herein described. Note, all numerical values herein described are approximate and are with reference to preferred embodiments only.

The coil structures herein described have been designed to produce, in magnitude, a substantially uniform magnetic field over a well defined volume. The substantially uniform field strength enables a uniform voltage to be induced to a transponder or other unit thereby reducing the demand upon any voltage regulation circuitry that may be required to be carried in the transponder.

Figure 5:
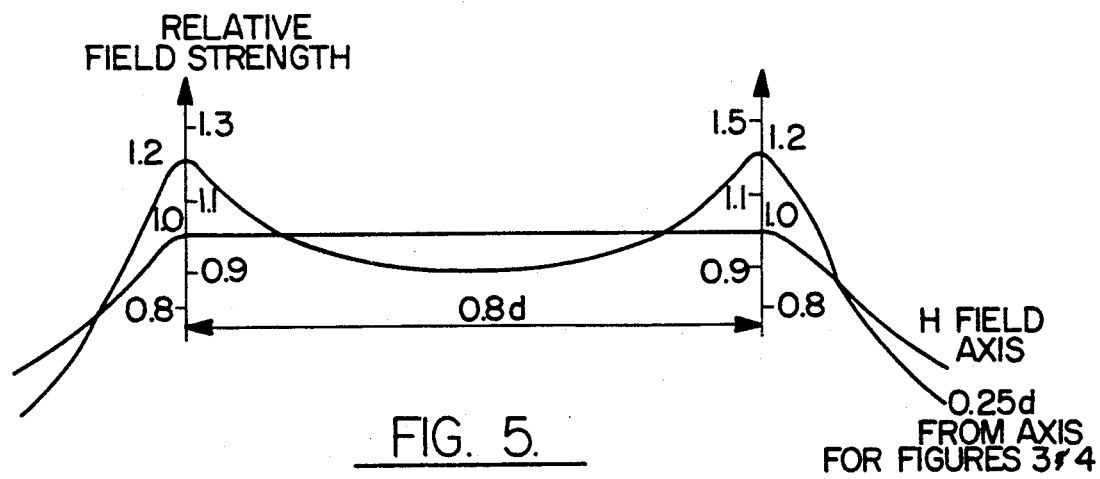
FIG. 5 depicts field strength measurements of the arrangements of FIGS. 3 and 4.

The coil structure shown in FIG. 3 consists of a pair of coils facing each other. The gap between the coils can be chosen to produce the necessary uniform field strength. It has been found that for square and circular coils, a coil spacing in the range 1.2 to 0.5 and preferably substantially 0.8 times the length of one side (d) or the diameter (d) of a coil enables a substantially constant field magnitude distribution to be obtained along the H field axis between the spaced coils. The field strength at a point up to substantially 0.25 d perpendicular or laterally to that axis will provide a field intensity as shown in FIG. 5.

For two or three dimensional inductive powering, a pair of square or circular coils spaced at 0.8 d may be used to generate a magnetic field along a desired orthogonal axis. When three coil pairs are used and combined to provide a cubic structure, there will be therein provided a small region or point of constant field magnitude. A cube or sphere within which field intensity varies only marginally surrounds this constant point. The cube has a side length of 0.5 d (i.e. 2×0.25 d) and the sphere has a diameter of 0.5 d. Within this cube or sphere, the power will vary in magnitude substantially 20% greater nearest the powering coils and substantially 10% less in the middle of each side relative to the constant point. Thus, the powering structure provides a space within which an acceptable powering field is provided.

Figure 6A:
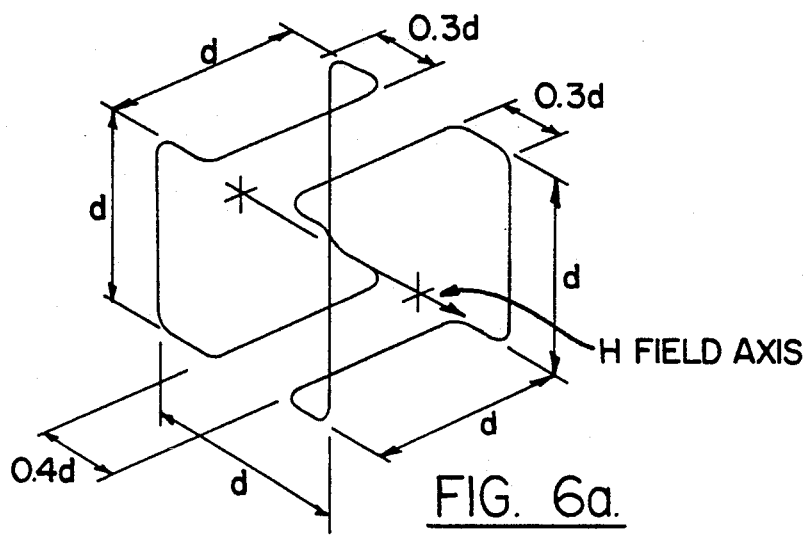
Figure 6B:
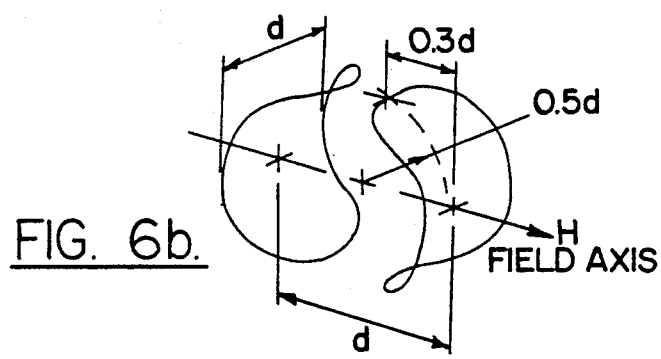

A more complicated coil pair shown in FIGS. 6a and 6b may also be used to further improve the uniform distribution of the magnetic field over a larger volume of a cubic or spheric structure. The preferred spacing of the field radiator coils is 0.4 d, as shown in FIGS. 6A and 6B. Current circulating in this coil pair may generate a field along the H axis substantially as indicated. This type of coil structure comprises coils substantially "C" shaped in side view. A cubic or spheric structure may be formed from C shaped coils wherein a substantially uniform magnitude field is provided in a cube or sphere, the cube having sides of 0.7 d in length (compared with substantially 0.5 d cube for the flat coil structure of FIG. 3), and the sphere having a radius of 0.35 d (compared with substantially 0.25 d for the flat coil structure of FIG. 4). A combination of flat and C shaped coils can provide uniformity within a cube ranging in size from 0.7 d to 0.5 d or within a sphere ranging in radius from 0.35 d to 0.25 d. Within the cube or sphere, the field will vary in intensity by +20% to −10%.

Expanding the coil turns so that a solenoid like structure is achieved may provide a more even field distribution. FIG. 7(a) shows three coil structures which when combined together, provide a substantially uniform field over greater than substantially 0.7 d of the coil's cross section. It should be noted that the structure of FIG. 7(a), when combined, will provide powering in three dimensions as hereinbefore described, but will also have two sides of the 3 D cube open to allow entry and exit passages through which external unit(s) can proceed and so be influenced by the 3 D field irrespective of the unit(s) orientation. The greater the number of coil windings in each orthogonal axis, the larger the area over which a constant field is produced. The magnetic field (H) may be generated in all three axes as shown in FIGS. 7(a), 7(b) and 7(c).

The most preferred two dimensional power field is generated by two orthogonal coil pairs, the coils being excited by a sine and cosine wave signal, respectively. This produces a circularly polarized magnetic field in the plane of the two coil pairs. Power transfer to a transponder contained between the coils is substantially uniform and independent of the axial position within the two planes.

For three dimensional powering, three orthogonal coil pairs are required. Accurate control of the frequency and phase exciting each coil pair is necessary for generating a constant magnitude powering field.

A preferred method includes exciting two coil pairs at the same time; the third coil pair remains idle. The two 'on' coil pairs are excited by a sine and cosine wave current, respectively, as for the two dimensional case. Reception of response signals from a field excited transponder is performed by antenna(s) in the same axis as the two "on" coil pairs irradiating the powering field.

This may produce a circularly polarized magnetic field in the plane of the two excited coil pairs. The polarized magnetic plane may then be sequenced between the three possible polarization planes. This sequencing may be performed in several ways. Preferably, the first and second coil pairs can be excited with a sine and cosine current, respectively. The sine current excitation to the first coil pair may then be turned off and redirected to the third coil pair. Subsequently, the cosine current excitation of the second coil pair can be removed and directed to the first coil pair. This process of removing excitation from the longest running coil pair and directing it to the idle coil pair can be repreated in a continuous or sequential manner (FIG. 28). The rate of switching should be chosen to allow sufficient time for a randomly orientated transponder to identify itself. It should be noted that, at each sequencing interval, the phase of the excitation directed to the idle coil pair may be reversed by 180° without impairing the uniform transfer of power. Using this method of coil pair phasing and switching, the average power transferred to a transponder pickup coil may be substantially near uniform and substantially independent of the pickup coil's orientation within the powering field.

Even though each coil pair is orthogonally orientated with respect to the other coil pairs, there will be some mutual coupling between coil pairs. This mutual coupling can be substantially reduced by winding a small compensation coil in series with the coil pairs on each axis. The compensation coil is coupled to the field of another axis so as to substantially negate or reduce the mutual coupling already existing between the two respective coil axes. It is noteworthy that mutual coupling between air cored coils exhibits reciprocity. Hence, cancelling the mutual coupling from axis X to axis Y also cancels it from axis Y to axis X.

FIG. 22 diagrammatically shows a system for reducing the mutual coupling between all three axes. The degree of coupling to each compensation coil is varied to null out the mutual coupling.

The whole powering coil structure may be housed inside a metallic shielded housing. The shielding reduces both the radiation of the magnetic powering field from the powering coils and the reception of external interference by the transponder signal receivers. Ideally, the shielding should be made of a high conductivity metal such as copper or aluminium with a thickness of 4 to 5 skin depths at the powering frequency, preferably about 1 mm.

To reduce powering field leakage from the entrance and exit ports of the shielded housing, field cancelling coils coaxial with the point can be used. Current is directed through these coils so that the generated field opposes the axial leakage field (FIG. 23).

Capacitive radiation from the powering coils can be reduced by minimizing the voltage across the turns of the powering coils. This may be done by distributing the series tuning capacitor along the coil, i.e. inserting parts of the series tuning capacity in series with the powering coil(s) at points preferably evenly distributed along the coil length (FIG. 24).

A method and apparatus for receiving inductive RF, code or coded signal(s) transmitted by any number of remote unit(s) or transponder(s) will now be described. The receiving may be carried out simultaneously by antennas within the same structure which transmits magnetic power.

Antenna loop(s) may be adaptively tuned to the carrier frequency and receive the transponder signal. The loop(s) may be shielded with Faraday shields to alleviate stray capacitive coupling from altering the tuned frequency of the loops. Each loop may consist of one or more coils of conductor. The loops, if formed in a structure separate but enclosed by the powering coils, may be arranged in a manner similar to that of the powering coils, thereby receiving the transmitted signal along each of the orthogonal X, Y or Z axes. A pair of loops may be used for each axis and, in a preferred form, may be placed one on each side of the uniform powering region. The loop pairs may be placed as closely as possible to the region where inductive powering occurs as this provides a greater coupling efficiency between the transponder and the antenna loops. Any variation in signal transmission associated with the position of the transponder may be readily corrected by electronic automatic gain control circuitry in a known manner.

It is preferable that the voltage induced in the antenna loops by the powering field is kept as small as possible to minimize any influence upon the sensitive receiving circuitry. By extending each antenna to form a compensation coil, against the powering coil pair in the same axis as the antenna, this induced voltage can be substantially nulled out (FIG. 25).

By positioning each compensation coil to pickup signals from the other coil axes or by adding further compensation coils along the other axes, any pickup voltage from the other axes can be substantially nulled out (FIGS. 26A and 26B).

Interference from external sources can be substantially reduced or nulled out by an externally mounted compensation coil designed to receive interfering signals and substract them from the signal picked up by the antenna loop(s) (FIG. 27).

Enclosing all compensation coils in Faraday shields substantially prevents capacitive coupling from the powering coils.

FIG. 8 shows how the antenna loops may be preferably structured around the inductive powering region.

FIG. 9 shows a preferred pair of parallel connected antenna loops. Alternatively, the loop pairs may be connected in series and the single ended output voltage used as the received signal. A tuning capacitor may also be used to tune the series connected loops.

FIG. 10 shows a preferred series connected antenna loop.

A method and apparatus for control of a structure for two or three dimensional inductive powering of a remote device by controlling the magnetic field's frequency and phase are now to be described.

The magnetic field can be generated by currents circulating in specially structured coil pairs, as detailed above, or the field may be generated in any other conventional way. To improve the current(s) within the coil(s), each coil pair is tuned to resonance or near resonance at an operating frequency. Accurate tuning of the coil(s) provides for more efficient operation. Control of the resonant frequency may be provided by using a variable inductor (saturable reactor) or variable capacitor in series or parallel with each coil or coil pair.

Inductance is varied by a dc current. Phase sensing circuitry may monitor the current within the coil pairs and produce a dc current for controlling the variable inductor. Control of the phase of the currents circulating in the coils may be achieved by the phase means. A signal source of required frequency and phase drives each coil pair. The variable inductor enables each coil to be tuned to resonate at substantially the same frequency. The variable inductor may also provide compensation for fluctuations in coil tuning caused by time, temperature, object proximity, etc. FIG. 11 shows two series configurations and FIG. 12 shows two parallel configurations incorporating a variable inductance for controlling resonant frequency.

With reference to FIGS. 11 and 12, Lc1 and Lc2 are the two coils used to generate the magnetic field along an axis, Ct is the tuning capacitance and Lv is the variable inductance. It is understood that these configurations may also apply if only one or more than two coils are used.

A small value resistance or current transformer coupled in series with the tuned circuit can sense the phase of the coil's current. A phase detector can compare the current's phase and the input signal's phase, the output of which can be filtered and provide a dc control current for use by the variable inductance. This system is not a phase locked loop, rather it is a phase feedback loop. FIG. 13 shows a schematic of this type of system and an example circuit implementation thereof is shown in FIG. 14.

The variable inductance may preferably be made from two anti-parallel magnetically isolated coils. FIG. 15 shows this in stylized form. Two high permeability cores act as magnetic paths for the flux generated by coils L1 and L2. These coils are wound so that their fluxes are oppositely directed through the control winding Lc. L1 and L2 have the same number of turns. Since they are wired in parallel, they both have equal voltages across them, therefore, the rate of change of flux in their respective toroid cores is substantially identical. Consequently, the total flux change in the control winding is substantially zero and little, if any, voltage is induced into the control winding, even when substantial currents flow through L1 and L2. Passing a dc current through the control winding pre-biases the cores with oppositely directed fluxes. During one half of the ac cycle, the dc flux opposes the ac flux in one core while it aids it in the other core. During the second half of the cycle, the ac flux reverses direction and aids the dc flux in the first core while opposing it in the second core. This repeats for each cycle. If the flux in the core with aiding flux exceeds the saturation level, then the dynamic permeability becomes very small and the inductance of the coil wound on to the core is reduced. The inductance of the system is substantially the parallel inductance of L1 and L2. Hence, the inductance becomes very small. While the inductance may not be constant over a cycle, the modification of the coil's resonant frequency depends upon the average inductance per cycle of the variable inductor. Various waveforms for the variable inductor are shown in FIG. 16. When either L1 or L2 saturates, their inductance becomes very small and the voltage across them becomes almost zero. Inductance is defined by the voltage induced for a rate of change in current. Extracting the fundamental component of voltage across the inductor for a fixed sinusoidal current will give the effective inductance. The effect of higher harmonic terms is attenuated by the filtering action of the tuned coils. As the dc control current is increased, the effective inductance is reduced from a maximum unsaturated core value to that of parallel air cored inductors.

The preferred arrangement works well in the series connected case as shown in FIG. 11. In this configuration, a small inductance with a large control range may provide adequate control of the tuned coil pair resonant frequency. Adequate control, of course, is dependant upon the overall system's particular application.

The parallel case as shown in FIG. 12 may require a large parallel inductance with a small control range to adequately control the resonant frequency. This may be achieved by placing a large fixed inductance in series with a smaller variable inductance, as shown in FIG. 17. A standard transformer core can also be used to construct a variable inductance, as shown in FIG. 18. The rate of change of flux through the center leg from L1 and L2 is constrained to substantially zero by the antiparallel connection of L1 and L2. Consequently, relatively no ac voltage is coupled into the control winding Lc.

If ac voltage couples into the center leg because of uneven winding of L1 and L2, then an inductance in series with the control winding will alleviate any upset in the control dc circuitry from this ac voltage.

Figure 19:
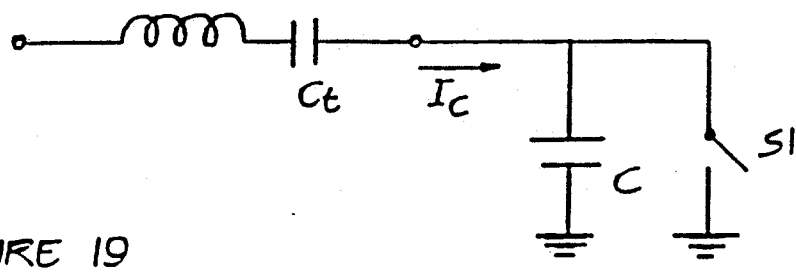

FIG. 19 shows a variable capacitor used to control the coil pair resonant frequency. The capacitance is varied by controlling the duty cycle of the switch closure S1.

Figure 20:
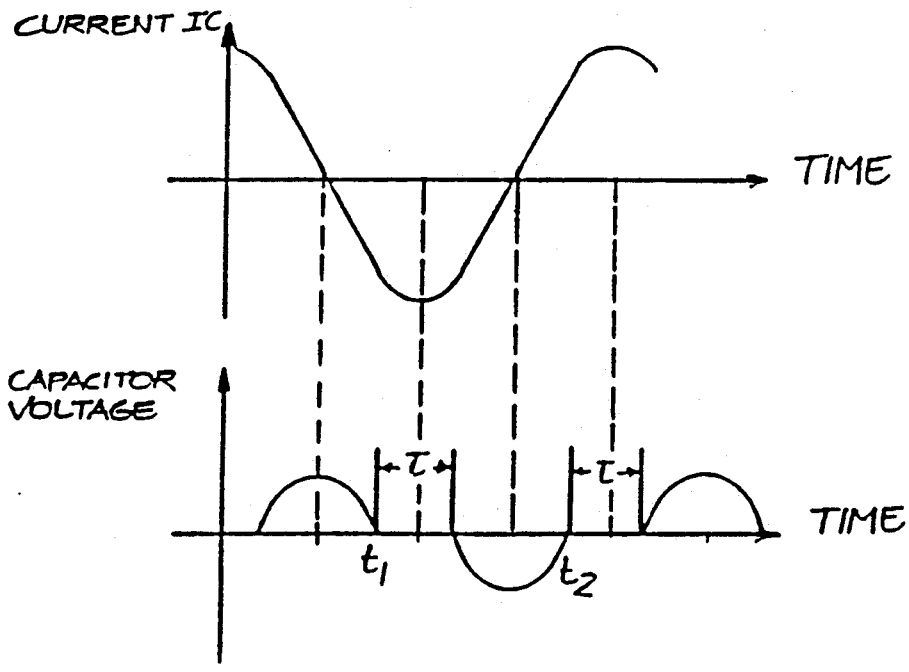

With reference to FIG. 20, when the voltage across capacitor C in FIG. 19 is zero ($t_1$) switch S1 closes and stays closed for period I where upon it opens. The capacitor C is charged for the remainder of the cycle by the coil current. When the capacitor voltage is next zero ($t_2$) the switch again recloses for I. The cycle is then repeated The effective capacitance of the switch capacitor combination varies from the full capacitance C when the switch is always open to infinite capacitance when the switch is always closed.

Figures 21A, 21B:
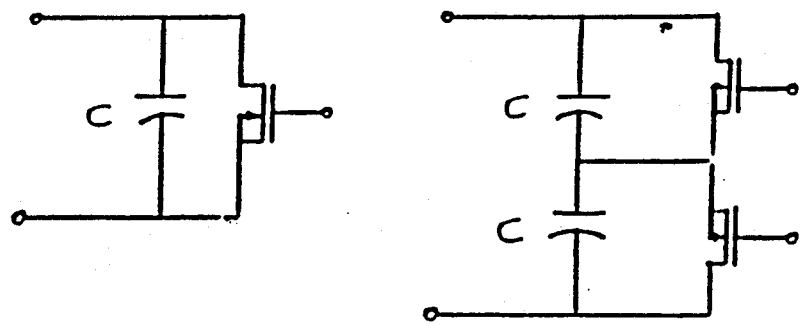

FIG. 21 shows some practical embodiments of the variable capacitor. The dc voltage across C varies with the switching duty cycle in the circuit shown in FIG. 21A. The circuit shown in FIG. 21B does not suffer from this.

The claims defining the invention are as follows:

1. An apparatus for powering a transponder within a volume of space having width, height and depth directions, said apparatus being adapted to power the transponder at a substantially uniform level of power irrespective of the transponder's orientation and position within the volume of space, said apparatus comprising:
   first, second and third powering coils, each coil being adapted to radiate a respective powering field for reception by the transponder, each coil being further adapted to radiate the powering field respectively in one of the width, height and depth directions in said volume of space, means for applying current to each coil, said current applying means being adapted to excite each respective coil in a predetermined manner, wherein:
   said means for applying current sinusoidally exciting any two of the coils at any one time by providing excitation in the form of sine and cosine signals of the same frequency, the sine signal to one of the coils, the cosine signal to another of the coils while the unexcited coil is left idle,
   said excitation being provided in a sequential and periodic manner in that said excitation is removed from the coil winding excited for the longest time and is applied to the previously unexcited coil, and
   further wherein each signal exciting the coils is unmodulated.

2. An apparatus for powering a transponder within a volume of space having width, height and depth directions, said apparatus being adapted to power the transponder at a substantially uniform level of power irrespective of the transponder's orientation and position within the volume of space, said apparatus comprising:
   first, second and third powering coils, each coil being adapted to radiate a respective powering field for reception by the transponder, each coil being further adapted to radiate the powering field respectively in one of the width, height and depth directions in said volume of space, and means for applying current to each coil, said current applying means being adapted to excite each respective coil in a predetermined manner, wherein:
   said means for applying current sinusoidally exciting three of the coils by providing excitation in the form of a first sine signal to one coil and a substantially in-phase second sine signal of same frequency to another coil,
   said means for applying current further providing a same frequency cosine signal to the third coil, and
   further wherein each of said first and said second sine signals is double side band modulated at a low frequency with a phase shifted angle of substantially 90°.

3. An apparatus for powering a transponder within a volume of space having width, height and depth directions, said apparatus being adapted to power the transponder at a substantially uniform level of power irrespective of the transponder's orientation and position within the volume of space, said apparatus comprising:
   first, second and third powering coils, each coil being adapted to radiate a respective powering field for reception by the transponder, each coil being further adapted to radiate the powering field respectively in one of the width, height and depth directions in said volume of space, and means for applying current to each coil, said current applying means being adapted to excite each respective coil in a predetermined manner, wherein:
   said means for applying current sinusoidally exciting three of the coils by providing excitation in the form of sine and cosine signals of the same frequency, the sine signal to one coil, the cosine signal to another coil,
   said means for applying current further providing a signal marginally different in frequency from the single frequency sine and cosine signals to the third coil, and
   further wherein each signal exciting the coils is unmodulated.

4. An apparatus for powering a transponder within a volume of space having width, height and depth directions, said apparatus being adapted to power the transponder at a substantially uniform level of power irrespective of the transponder's orientation and position within the volume of space, said apparatus comprising:
   first, second and third powering coils, each coil being adapted to radiate a respective powering field for reception by the transponder, each coil being further adapted to radiate the powering field respectively in one of the width, height and depth directions in said volume of space, and means for applying current to each coil, said current applying means being adapted to excite each respective coil in a predetermined manner, wherein:
   said means for applying current sinusoidally exciting three of the coils, one coil with a single frequency first signal, another coil with a single frequency second signal, said means for applying current further providing a third signal to the third coil, each signal differing from each other marginally in frequency, and
   further wherein each signal exciting the coils is unmodulated.

5. An apparatus as claimed in claim 1, 2, 3 or 4, wherein capacitive radiation from a powering coil is reduced by distributing a series tuning capacitor along the coil.

6. An apparatus as claimed in claim 1, 2, 3, or 4, wherein each coil is formed of a pair of windings of predetermined configuration, the winding pair being positioned adjacent each other in opposite and facing configuration.

7. An apparatus as claimed in claim 6, wherein each winding pair includes a separation distance between the windings of up to two times the length of a side of the winding pair.

8. An apparatus as claimed in claim 7, wherein the separation distance is substantially 0.8±0.1 times the length of a side of the winding pair.

9. An apparatus as claimed in claim 1, 2, 3 or 4, wherein one of the powering coils is a solenoid coil.

10. An apparatus as claimed in claim 6, wherein the predetermined configuration of each winding is square.

11. An apparatus as claimed in claim 6, wherein the predetermined configuration of each winding is rectangular.

12. An apparatus as claimed in claim 6, wherein the predetermined configuration of each winding is elliptical.

13. An apparatus as claimed in claim 6, wherein the predetermined configuration of each winding is circular.

14. An apparatus as claimed in claim 6, wherein the predetermined configuration of each winding is C-shaped.

15. An apparatus as claimed in claim 6, wherein each winding of each pair of windings is arranged in substantially parallel planes.

16. An apparatus as claimed in claim 6, further comprising a mutual coupling element in the form of an inductance in series with at least one of said coils for substantially reducing mutual coupling between coils for different directional fields, each inductance being mutually coupled into the magnetic field of at least one other coil.

17. An apparatus as claimed in claim 6 in combination with a receiving unit having a pickup coil, the receiving unit being positioned within the substantially uniform magnetic field.

18. An apparatus as claimed in claim 17, wherein at least a portion of said pickup coil is enclosed in a Faraday shield.

19. An apparatus of claimed in claim 17, further comprising at least one coil element, each coil element being provided in series with a respective receiving coil, each coil element being adapted to reduce the mutual coupling between the receiving coil and coil element and at least one of said coils providing said powering field.

20. An apparatus as claimed in claim 17, further comprising at least one interference element, each interference element being provided in series with a respective coil, each interference element being a further coil adapted to obviate interference signals radiating from sources external to said apparatus.

21. An apparatus as claimed in claim 1, 2, 3 or 4, wherein said means for applying current is adjusted to compensate for frequency characteristics of the transponder by adjusting the relative magnitude of the respective signals along each axis so that constant power independent of orientation will be absorbed by the transponder.

22. An apparatus for radiating a magnetic field of substantially uniform magnitude along an axis in a volume of space having width, height and depth directions, said apparatus comprising:
a first coil arranged in the width and height directions and having a first imaginary axial point at its center;
a second coil arranged in the width and height directions and having a second imaginary axial point at its center,
said first and said second coils each having a side and a predetermined configuration and being positioned adjacent each other in opposite and facing configuration,
means for applying current to the first and second coils,
the first and second coils being spaced by a separation distance of up to two times the length of one of the sides of said coils to provide in response to a current applied to the coils from said current applying means, said substantially uniform magnetic field within said volume of space,
wherein the volume of space is located between said first and second imaginary axial points and extends in the depth direction in the form of an imaginary tube having a surface defining said volume of space of substantially constant radius from the axis defined by said first and second axial points, and
the variation between the maximum and minimum magnetic field strengths within said volume of space is not more than 30% and the radius decreases with increases in the separation distance, wherein said first and second coils define a first coil pair, and further comprising a second coil pair and means for applying current thereto, and wherein each pair of coils is arranged along a different axis,
further comprising a mutual coupling element in the form of an inductance in series with at least one of said coils for substantially reducing mutual coupling between coils for different directional fields, each inductance being mutually coupled into the magnetic field of at least one other coil.

23. An apparatus for radiating a magnetic field of substantially uniform magnitude along an axis in a volume of space, having width, height and depth directions, said apparatus comprising:
a first coil arranged in the width and height directions and having a first imaginary axial point at its center,
a second coil arranged in the width and height directions and having a second imaginary axial point at its center, said second coil being spaced from said first coil,
said first and said second coils each having a side and a predetermined configuration and being positioned adjacent each other in opposite and facing configuration,
means for applying current to the first and second coils,
the first and second coils being spaced by a separation distance of up to two times the length of one of the sides of said coils to provide in response to a current applied to the coils from said current applying means, said substantially uniform magnetic field within said volume of space,
wherein the volume of space is located between said first and second imaginary axial points and extends in the depth direction in the form of an imaginary tube having a surface defining said volume of space of substantially uniform magnetic field, said imaginary tube surface being spaced radially at a substantially constant radius from the axis defined by said first and second axial points, and the variations between the maximum and minimum magnetic field strengths within said volume of space is not more than 30% and the radius decreases with increases in the separation distance, wherein said first and second coils define a first coil pair, and further comprising a second coil pair and means for applying current thereto, said second coil pair having third and fourth opposingly positioned coils, and wherein each pair of coils is arranged along a different axis, further comprising a third coil pair having fifth and sixth opposingly positioned coils and means for applying current thereto, the third coil pair being arranged to provide, in response to a third current from the respective current applying means, a third field extending in the height direction, the first, second and third fields being of substantially equal magnitude, each field being of substantially constant magnitude interposed with their respective windings, thereby providing in the depth, width, and height directions a three dimensional substantially constant magnitude field, further comprising signal receiving coils arranged adjacent said first, second and third pairs of coils radiating the substantially uniform magnetic field so as to receive signals provided by a receiving unit powered by said field, wherein the receiving coils are arranged in a cubic arrangement of six loop antennas, each loop antenna defining one plane of a cube and wherein the cube defines said substantially uniform magnetic field radiated by said first, second and third pairs of coils.

24. An apparatus as claimed in claim 23, wherein each receiving coil comprises at least one coil of conductor having at least a portion thereof enclosed in a Faraday shield.

25. An apparatus as claimed in claim 23, wherein at least two of said planes are normal to at least one of the said depth, width, or height directions.

26. An apparatus for radiating a magnetic field of substantially uniform magnitude along an axis in a volume of space having width, height and depth directions, said apparatus comprising:

a first coil arranged in the width and height directions and having a first imaginary axial point at its center, a second coil arranged in the width and height directions and having a second imaginary axial point at its center, said second coil being spaced from said first coil, said first and second coils each having a side and a predetermined configuration and being positioned adjacent each other in opposite and facing configuration, means for applying current to the first and second coils, the first and second coils being spaced by a separation distance of up to two times the length of one of the sides of said coils to provide in response to a current applied to the coils from said current applying means, said substantially uniform magnetic field within said volume of space, wherein the volume of space is located between said first and second imaginary axial points and extends in the depth direction in the form of an imaginary tube having a surface defining said volume of space of substantially uniform magnetic field, said imaginary tube surface being spaced radially at a substantially constant radius from the axis defined by said first and second axial points, and the variation between the maximum and minimum magnetic field strengths within said volume of space is not more than 30% and the radius decreases with increases in the separation distance wherein said first and second coils define a first coil pair, and further comprising a second coil pair and means for applying current thereto, and wherein each pair of coils is arranged along a different axis, further comprising signal receiving coils arranged adjacent said first and second pairs of coils radiating the substantially uniform magnetic field so as to receive signals provided by a receiving unit powered by said substantially uniform magnetic field, further comprising the least one coil element, each coil element being provided in series with a respective receiving coil, each coil element being adapted to reduce the mutual coupling between the receiving coil and coil element and at least one of said coils providing said powering field.

27. An apparatus for radiating a magnetic field of substantially uniform magnitude along an axis in a volume of space having width, height and depth directions, said apparatus comprising:

a first coil arranging in the width and height directions and having a first imaginary axial point at its center, said second coil being spaced from said first coil, said first and second coils each having a side and a predetermined configuration and being positioned adjacent each other in opposite and facing configuration, means for applying current to the first and second coils, the first and second coils being spaced by a separation distance of up to two times the length of one of the sides of said coils to provide in response to a current applied to the coils from said current applying means, said substantially uniform magnetic field within said volume of space, wherein the volume of space is located between said first and second imaginary axial points and extends in the depth direction in the form of an imaginary tube having a surface defining said volume of space of substantially uniform magnetic field, said imaginary tube surface being spaced radially at a substantially constant radius from the axis defined by said first and second axis points, and the variation between the maximum and minimum magnetic field strengths within said volume of space is not more than 30% and the radius decreases with increases in the separation distance, wherein said first and second coils define a coil pair, and further comprising a second coil pair and means for applying current thereto, and wherein each pair of coils is arranged along a different axis, further comprising signal receiving coils arranged adjacent said first and second pairs of coils radiating the substantially uniform magnetic field so as to receive signals provided by a receiving unit powered by said substantially uniform magnetic field, further comprising at least one interference element, each interference element being provided in series with a respective coil, each interference element being a further coil adapted to obviate interference signals radiating from sources external to said apparatus.

* * * * *